(12) United States Patent
Price et al.

(10) Patent No.: US 10,339,631 B2
(45) Date of Patent: Jul. 2, 2019

(54) IMAGE DEMOSAICING FOR HYBRID OPTICAL SENSOR ARRAYS

(71) Applicant: Microsoft Technology Licensing, LLC, Redmond, WA (US)

(72) Inventors: Raymond Kirk Price, Redmond, WA (US); Denis Demandolx, Bellevue, WA (US); Michael Bleyer, Seattle, WA (US); Jian Zhao, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/403,980

(22) Filed: Jan. 11, 2017

(65) Prior Publication Data

US 2018/0197274 A1    Jul. 12, 2018

(51) Int. Cl.
*G06T 3/40*  (2006.01)
*H04N 5/33*  (2006.01)
*G06T 7/55*  (2017.01)
*G01B 11/25*  (2006.01)

(52) U.S. Cl.
CPC .......... *G06T 3/4015* (2013.01); *G01B 11/25* (2013.01); *G06T 7/55* (2017.01); *H04N 5/332* (2013.01); *G06T 2207/10024* (2013.01); *G06T 2207/10048* (2013.01)

(58) Field of Classification Search
CPC ..... H04N 5/332; G06T 3/4015; G06T 3/4007; G06T 2207/10048; G06T 2207/10028; G06T 7/55
USPC ...................................................... 382/300
See application file for complete search history.

(56) References Cited

U.S. PATENT DOCUMENTS

| 5,488,674 | A | 1/1996 | Burt et al. |
| 7,375,803 | B1 | 5/2008 | Bamji |
| 8,462,238 | B2 * | 6/2013 | Fredembach ..... H01L 27/14621 348/273 |
| 8,558,899 | B2 | 10/2013 | Grycewicz |
| 8,619,143 | B2 | 12/2013 | Motta |
| 8,780,113 | B1 | 7/2014 | Ciurea et al. |

(Continued)

FOREIGN PATENT DOCUMENTS

| CN | 105427253 A | 3/2016 |
| EP | 1992987 B1 | 7/2010 |

OTHER PUBLICATIONS

Gschwandtner, et al., "Infrared Camera Calibration for Dense Depth Map Construction", In Proceedings of IEEE Intelligent Vehicles Symposium, Jun. 5, 2011, pp. 857-862.

(Continued)

*Primary Examiner* — Daniel G Mariam
(74) *Attorney, Agent, or Firm* — Alleman Hall Creasman & Tuttle LLP

(57) ABSTRACT

A hybrid optical sensor array includes a first and second set of pixels having differing spectral sensitivities. A first set of data for a scene is captured by the first set of pixels at a first resolution, and a second set of data for the scene is captured by a second set of pixels at a second resolution. The first set of data is demosaiced based on at least the second set of data. A third set of data for the scene is output at a third resolution, greater than the first resolution. This allows high resolution matching images to be produced without perspective or timing discrepancies inherent in multi-camera machine vision systems.

26 Claims, 19 Drawing Sheets

(56) References Cited

U.S. PATENT DOCUMENTS

| | | | |
|---|---|---|---|
| 9,041,829 B2 | 5/2015 | Venkataraman et al. | |
| 9,047,684 B2 | 6/2015 | Lelescu et al. | |
| 9,049,367 B2 | 6/2015 | Venkataraman et al. | |
| 9,076,703 B2 | 7/2015 | Bishay | |
| 9,123,118 B2 | 9/2015 | Ciurea et al. | |
| 9,147,254 B2 | 9/2015 | Ciurea et al. | |
| 9,344,689 B2 | 5/2016 | Choi et al. | |
| 9,361,662 B2 | 6/2016 | Lelescu et al. | |
| 9,826,130 B2* | 11/2017 | Hu | H04N 5/2254 |
| 9,930,316 B2 | 3/2018 | Zhang | |
| 2010/0097491 A1 | 4/2010 | Farina et al. | |
| 2010/0254630 A1* | 10/2010 | Ali | G06T 3/4053 |
| | | | 382/300 |
| 2014/0138519 A1 | 5/2014 | Wang et al. | |
| 2015/0138366 A1* | 5/2015 | Keelan | H04N 9/64 |
| | | | 348/164 |
| 2016/0073043 A1 | 3/2016 | Stork et al. | |
| 2016/0080626 A1 | 3/2016 | Kovtun et al. | |
| 2017/0374299 A1* | 12/2017 | Liu | H04N 5/332 |
| 2018/0197275 A1 | 7/2018 | Price et al. | |

OTHER PUBLICATIONS

"OV4682 RGB IR Color CMOS 4-megapixel (2688×1520) Image Sensor with OmniBSI-2™ Technology", Version 2.2; Oct. 2014; retrieved at http://www.ovt.com/products/sensor.php?id=145, 4 pages.

Farsiu, et al., "Multiframe Demosaicing and Super-Resolution of Color Images", In Proceedings of IEEE Transactions on Image Processing, vol. 15, No. 1, Jan. 2006, pp. 141-159.

Farsiu, et al., "A Practical Approach to Superresolution", In Proceedings of Visual Communications and Image Processing, vol. 6077, Jan. 2006, 2 pages.

Murakami, et al., "Hybrid-resolution spectral video system using low-resolution spectral sensor", In Journal of Optics Express, vol. 22, No. 17, Aug. 25, 2014, pp. 20311-20325.

Zhang, et al., "Capturing Images with Sparse Information Pixels using Projected 3D Tags", In Proceedings of IEEE Virtual Reality Conference, Mar. 8, 2008, 8 pages.

"Time of Flight: Samsung's New RGB Image Sensor Also Has Depth Sight", Mar. 1, 2012; Retrieved at: http://www.embedded-vision.com/news/2012/03/01/time-flight-samsungs-new-rgb-image-sensor-also-has-depth-sight, 2 pages.

Wasenmuller, O. et al., "Combined Bilateral Filter for Enhanced Real-Time Upsampling of Depth Images", In Proceedings of International Conference on Computer Vision Theory and Applications, Mar. 11, 2015, Berlin, Germany, 8 pages.

Chuang, M. et al., "Color Filter Array Demosaicking Using Joint Bilateral Filter", In Proceedings of IEEE International Conference on Multimedia and Expo, Jun. 28, 2009, New York, New York, 4 pages.

Yang, Q. et al., "Fusion of Median and Bilateral Filtering for Range Image Upsampling", In Journal of IEEE Transactions on Image Processing, vol. 22, Issue 12, Dec. 2013, 12 pages.

Rafii, A. et al., "RGB-Z: Mapping a Sparse Depth Map to a High Resolution RGB Camera Image", In Proceedings of IEEE Computer Society Conference on Computer Vision and Pattern Recognition, Jun. 20, 2005, San Diego, California, 1 page.

"Non Final Office Action issued in U.S. Appl. No. 15/404,025", dated May 31, 2018, 9 Pages.

* cited by examiner

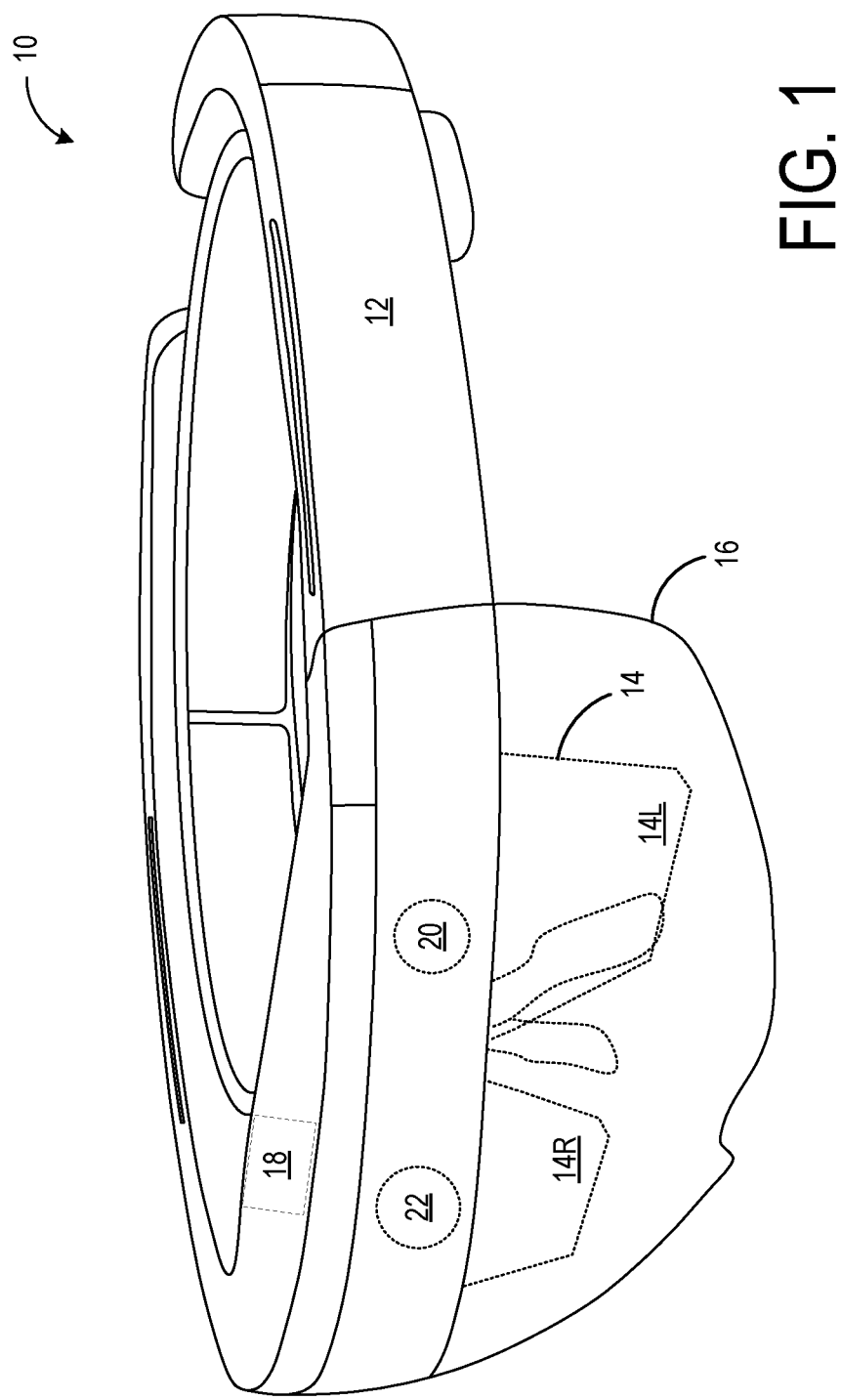

240

| IR | IR | IR | IR | IR | IR | IR | IR | IR | IR |
|----|----|----|----|----|----|----|----|----|----|
| V  | V  | V  | V  | V  | V  | V  | V  | V  | V  |
| IR | IR | IR | IR | IR | IR | IR | IR | IR | IR |
| V  | V  | V  | V  | V  | V  | V  | V  | V  | V  |
| IR | IR | IR | IR | IR | IR | IR | IR | IR | IR |
| V  | V  | V  | V  | V  | V  | V  | V  | V  | V  |
| IR | IR | IR | IR | IR | IR | IR | IR | IR | IR |
| V  | V  | V  | V  | V  | V  | V  | V  | V  | V  |
| IR | IR | IR | IR | IR | IR | IR | IR | IR | IR |
| V  | V  | V  | V  | V  | V  | V  | V  | V  | V  |

| B | G | B  | G  | B | G  | B | G  | B | G  |
|---|---|----|----|---|----|---|----|---|----|
| R | IR| R  | IR | R | IR | R | IR | R | IR |
| B | G | B  | G  | B | G  | B | G  | B | V  |
| R | IR| R  | IR | R | IR | R | IR | R | IR |
| B | G | B  | G  | B | G  | B | G  | B | G  |
| R | IR| R  | IR | R | IR | R | IR | R | IR |
| B | G | B  | G  | B | G  | B | G  | B | G  |
| R | IR| R  | IR | R | IR | R | IR | R | IR |
| B | G | B  | G  | B | G  | B | G  | B | G  |
| R | IR| R  | IR | R | IR | R | IR | R | IR |

IMAGE DEMOSAICING FOR HYBRID OPTICAL SENSOR ARRAYS

BACKGROUND

Depth cameras may be used to generate three dimensional representations of environments and objects in those environments. Such depth imaging devices may be paired with visible light cameras to generate rich data sets of an environment which may be used for both human and machine vision applications.

BRIEF DESCRIPTION OF THE DRAWINGS

FIG. 1 shows a schematic view of a head-mounted display device according to an example of the present disclosure.

FIGS. 2A-2E schematically show example pixel layouts for hybrid optical sensor arrays sensitive to both visible light and infrared light.

DETAILED DESCRIPTION

Figure 2A:
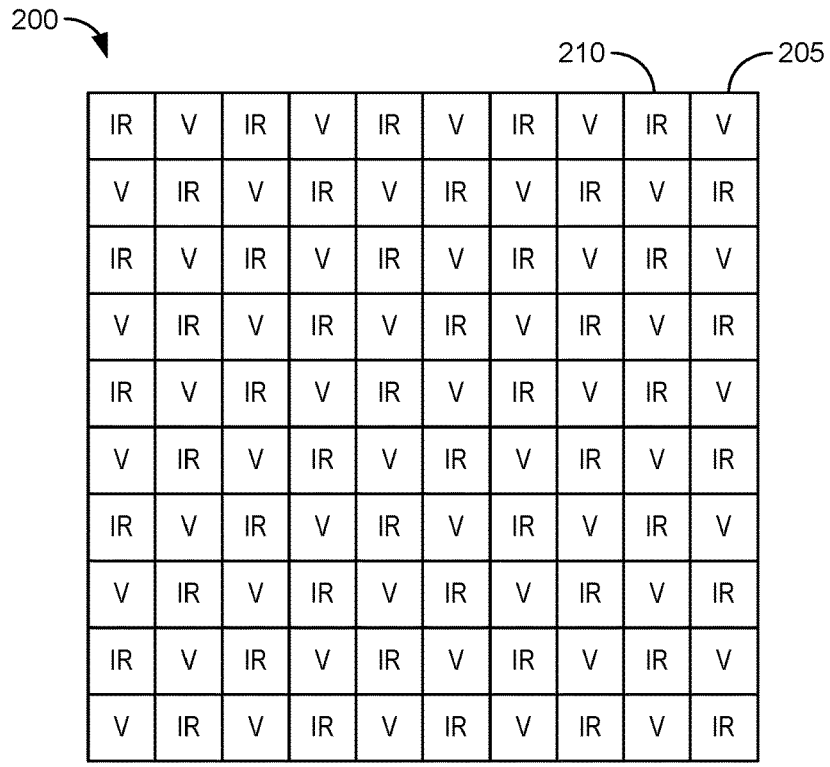

Machine and human vision applications benefit greatly from high resolution images in both the visible light spectrum and the infrared (I R) spectrum to provide critical information for applications such as hand tracking, head tracking, spatial mapping, and semantic labeling. Machine vision may be utilized in head-mounted displays, such as the head-mounted display device 10 depicted in FIG. 1. As an example, a visible light (i.e. greyscale) camera may be used for head tracking and discerning the position and orientation of the head-mounted display. Pose estimation may be performed when visible light images are combined with depth images. Combining RGB images with depth images may provide rich data that may be utilized for object recognition, live 3D reconstruction, augmented reality and/or virtual reality applications, as well as other applications involving human perception.

However, using separate visible and IR cameras to generate these images may yield suboptimal image pairs which may in turn reduce the accuracy of machine vision algorithms. The separate cameras may have different perspectives and lens distortion characteristics, and may also have timing discrepancies between frame captures if different shutters are used, resulting in poor quality reprojection between sensors. Furthermore, a multi-camera system increases monetary costs, has negative impacts on the form factor, and requires calibration of the cameras' intrinsic parameters.

Alternatively, a hybrid optical sensor may be used that includes both visible and IR pixels interspersed on a single substrate or array. The dual sensors thus have identical perspectives, exposure timing, focal length, lens distortion parameters, upfront optics, etc. These hybrid optical sensors have the additional advantage that the two resultant camera images are perfectly aligned and captured at the same instant. This approach eliminates perspective bias problems that may occur when two separate cameras are used, as well as any motion blur issues caused by timing discrepancies in the camera frame captures. Such hybrid sensors may thus provide rich and optimized contextual information for depth maps, IR maps, and visible light images.

However, hybrid optical sensor arrays may generate low resolution images for each subset of pixels, due to the interspersion of the pixels. This may result in reduced fidelity images, zippering and other image artifacts, reduced edge preservation and spatial information, and an increase in intermediate depth pixels. This description is directed to the application of demosaicing filters to images obtained from hybrid optical sensor arrays, including paired depth and visible light images. As described, this method of demosaicing may be used to increase image resolution while also preserving edges and other desirable aspects of the images.

FIG. 1 schematically illustrates an example head-mounted display device 10. The head-mounted display device 10 includes a frame 12 in the form of a band wearable around a head of user that supports see-through display componentry positioned nearby the user's eyes. Head-mounted display device 10 may use augmented reality technologies to enable simultaneous viewing of virtual display imagery and a real world background. As such, the head-mounted display device 10 may generate virtual images via see-through display 14, which includes separate right and left eye displays 14R and 141L, and which may be wholly or partially transparent. The see-through display 14 may take any suitable form, such as a waveguide or prism configured to receive a generated image and direct the image towards a wearer's eye. The see-through display 14 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 14 may utilize quantum-dot display technologies, active-matrix organic LED (OLED) technology, and/or any other suitable display technologies. It will be understood that while shown in FIG. 1 as a flat display surface with left and right eye displays, the see-through display 14 may be a single display, may be curved, or may take any other suitable form.

The head-mounted display device 10 further includes an additional see-through optical component 16, shown in FIG. 1 in the form of a see-through veil positioned between the see-through display 14 and the real world environment as viewed by a wearer. A controller 18 is operatively coupled to the see-through optical component 16 and to other display componentry. The controller 18 includes one or more logic devices and one or more computer memory devices storing instructions executable by the logic device(s) to enact functionalities of the head-mounted display device 10. The head-mounted display device 10 may further include various other components, for example a two-dimensional image camera 20 (e.g. a visible light camera and/or infrared camera) and a depth imaging device 22, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 22 may include an infrared light-based depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 18) may be configured to process the acquired video to identify one or more objects within the operating environment, one or more postures and/or gestures of the user wearing head-mounted display device 10, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the distance between the camera and the surface imaged by that pixel.

In some implementations, depth imaging device 22 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" (TOF) depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

In some examples, two-dimensional image camera 20 and depth imaging device 22 may share a single optical sensor, such as a hybrid optical sensor array. Such a hybrid sensor may comprise two or more interspersed subsets of pixels responsive to overlapping or non-overlapping light spectra. For example, a first subset of pixels may be sensitive to visible light (e.g., 400-650 nm) and a second subset of pixels sensitive to IR light (e.g., 750-900 nm). Although most examples described herein discuss systems and methods for hybrid optical sensor arrays comprising two pixel subsets, it should be understood that similar systems and methods are possible for arrays comprising three, four, or more subsets of pixels. For example, a hybrid optical sensor array may comprise a subset of pixels sensitive to UV light in addition to subsets sensitive to visible and/or IR light. In some examples, a hybrid optical sensor array may comprise four subsets of pixels sensitive to red, green, blue (RGB), and IR, respectively. The output of the RGB subpixel sensors may be combined to generate broadband visible light data. For machine visions applications, the active depth camera may operate based on the subsets of pixels in the IR spectral region, while the passive imaging camera may report a greyscale image based on the subsets of pixels sensitive to visible light.

An example hybrid optical sensor array is schematically shown in FIG. 2A. Hybrid optical sensor array 200 is shown comprising a first subset 205 of visible light sensitive pixels (V) and a second subset 210 of IR light sensitive pixels (IR). In this example, first subset 205 and second subset 210 are interspersed in a checkerboard-like pattern, such that visible light sensitive pixels and IR light sensitive pixels alternate in both the up-and-down and side-to-side directions. In such an example, both first subset 205 and second subset 210 sample incoming light with equivalent spatial distribution. The pixel distributions for each subset may have equal horizontal and vertical aspects, to facilitate structured light applications, for example.

Figure 2B:
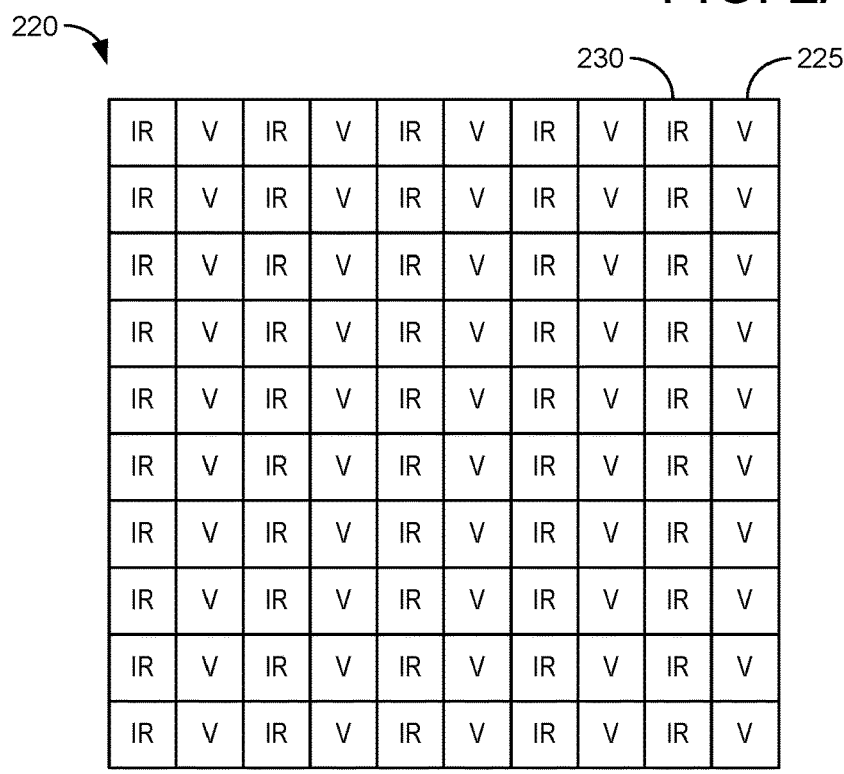

Additional example hybrid optical sensor arrays are schematically shown in FIGS. 2B-C. FIG. 2B shows hybrid optical sensor array 220 comprising a first subset 225 of visible light sensitive pixels (V) and a second subset 230 of IR light sensitive pixels (IR). In this example, first subset 225 and second subset 230 are column interleaved. FIG. 2C shows hybrid optical sensor array 240 comprising a first subset 245 of visible light sensitive pixels (V) and a second subset 250 of IR light sensitive pixels (IR). In this example, first subset 245 and second subset 250 are row interleaved. Hybrid optical sensor arrays 220 and 240 allow for the simplification of both array design and sensor readout.

In some examples, each individual IR sensitive pixel may include an integral differential pixel. Such pixels may be used in hybrid TOF depth and visible light sensing applications, for example. In phased TOF applications, harmonic light waves may be emitted at 10-250 MHz. The phase shift may then be measured between the illumination source and the sensor response. The depth technology, based on an actively illuminated narrow-band IR light source, can be based on either TOF or structured light depth sensing technology.

In each of the examples in FIGS. 2A-2C, the allocation of visible and IR light pixels is approximately 50% visible and 50% IR sensitive pixels. However, other ratios are possible without departing from the scope of this disclosure. In each example, the IR pixel design may include elements (e.g., filters) to reduce sensitivity to visible light, while the visible light pixels may include elements to reduce IR sensitivity. The visible light sensitive pixels may be configured to output grayscale values in the form of grayscale broadband visible light data. Alternatively, the visible light sensitive pixels may be configured to output values over a range of the full visible light spectrum, or a portion thereof.

In the examples shown in FIGS. 2A-2C, each hybrid optical sensor array comprises n pixels, and each subset comprises less than n (n/2 in these examples). If a full resolution image comprises n pixels, then the array will yield two low resolution images of n/2 pixels, one each for the subsets of visible light and IR light sensitive pixels. With regard to hybrid optical sensor array 200, if a half resolution image containing the n/2 V-pixels is extracted, it would yield an image where every other line is displaced by 0.5 pixels and horizontal streaks at object outlines would be the consequence. Machine vision applications often involve looking for "key points" (e.g., points with high spatial information/frequency) If imaged objects have low resolution, fidelity and detail may also be lost, making the objects more difficult to track. If object images show zippering effects, downstream processors would have to account for the specifics of the sensor, even when performing simple functions such as line detection.

Such effects may be more pronounced when there is a large disparity between the resolution of the visible and IR images. For example, RGB/IR hybrid optical sensor arrays may have imbalanced pixel subsets. FIG. 2D) schematically shows an RGB/IR hybrid optical sensor array 260. Array 260 comprises tiled repeats of a unit cell 265, having four pixels, one each of Red, Green, Blue, and Infrared pixels. As such, the allocation of visible and IR light pixels is approximately 75% visible and 25% IR sensitive pixels.

Figure 2E:
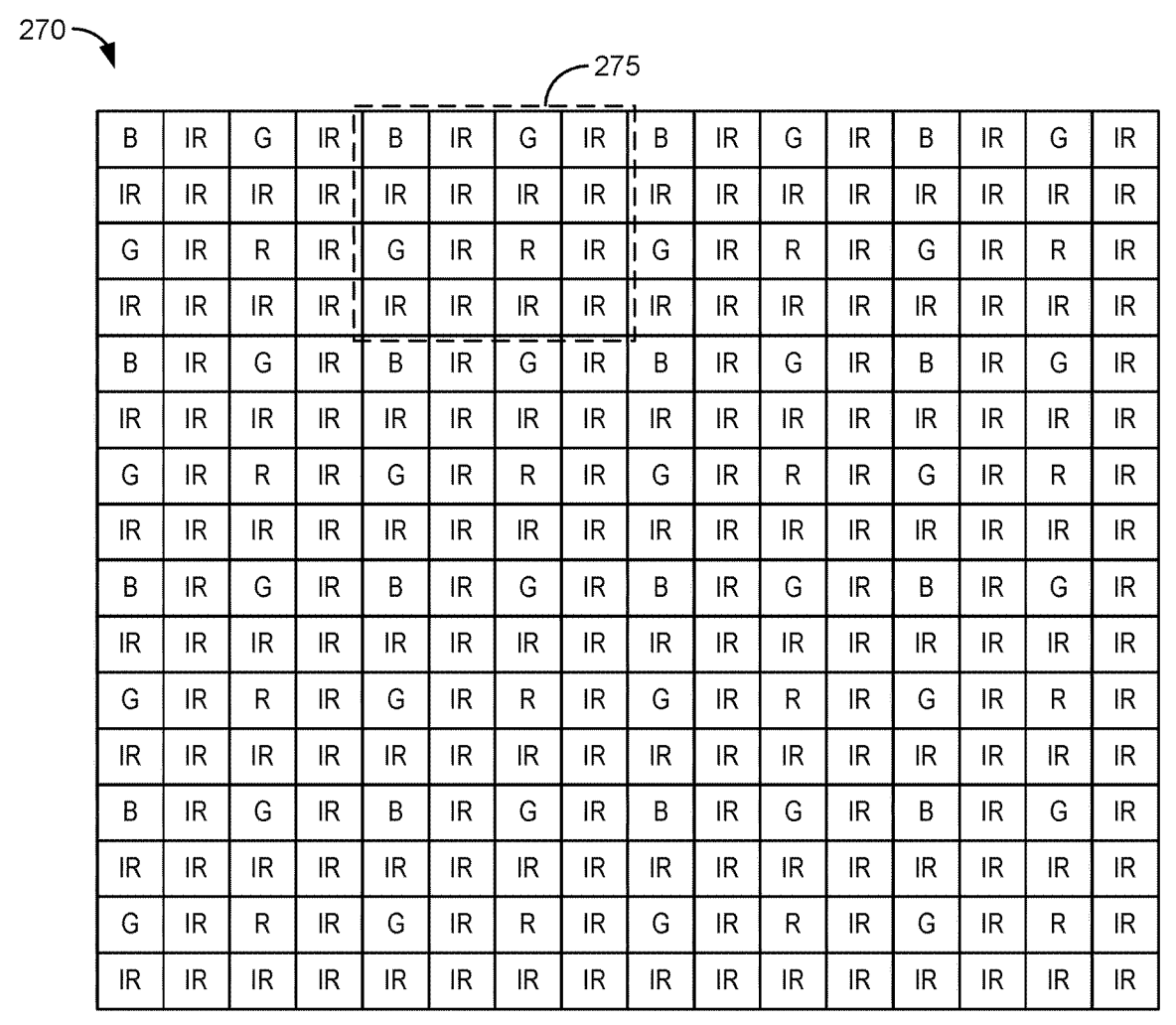

FIG. 2E schematically shows an additional RGB/IR hybrid optical sensor array 270. Array 270 comprises tiled repeats of a unit cell 275, comprising sixteen pixels, one each of Red, Green, and Blue pixels, interspersed among twelve IR pixels. As such, the allocation of visible and IR light pixels in array 270 is approximately 25% visible and 75% IR sensitive pixels. While array 270 may generate high-resolution IR (and/or depth) images, color images generated by such an array may have markedly low resolution.

To address the above-described problems, systems and methods are presented wherein data obtained from one pixel subset of a hybrid optical sensor array is used to demosaic data obtained from another pixel subset of the same hybrid optical sensor. The "missing" pixels for each subset are given values based on data obtained from other pixels within the sensor array, thus yielding full resolution images as the output. In this way, the number of cameras within a system may be reduced. In some scenarios, such as in poor lighting or suboptimal environments, the resultant full-resolution images may be of higher quality than those obtained by a camera comprising a full resolution sensor with a single pixel subset.

Using the example of hybrid optical sensor array 200 shown in FIG. 2A, data from IR pixels (subset 210) may be used to infill the data for the visible light pixels (subset 205), while the data from visible light pixels may be used to reconstruct edges in the obtained IR map. In general, edges for IR images correspond with edges for visible light images, making this relationship transitive. This may be exploited in scenarios where both pixel subsets acquire data with similar fidelity.

However, in some scenarios, one pixel subset may obtain higher quality data, and thus be weighted more heavily in reconstruction. For example, IR sensitive pixels will likely outperform visible light sensitive pixels in a small, dark room, while IR sensitive pixels may be saturated in an environment with high sunlight as compared with visible light sensitive pixels which may have a high return. Similarly, one pixel subset may produce higher resolution data than the other pixel subset, and thus may be given more weight during reconstruction, as per the RGB/IR arrays shown in FIGS. 2D and 2E, for example.

For applications where depth data is acquired in addition to raw IR and visible light images, additional information may be available that can be used as an input to demosaicing and interpolation filters. For example, active brightness, reflectivity (e.g., IR intensity/Depth), depth/distance values, and depth value confidence may be used as input parameters for data processing filters. This may allow for the outputting of full-resolution depth (and/or IR) and visible light images that maintain feature fidelity and preserve edges with reduced artifacts to the output images.

Figure 3:
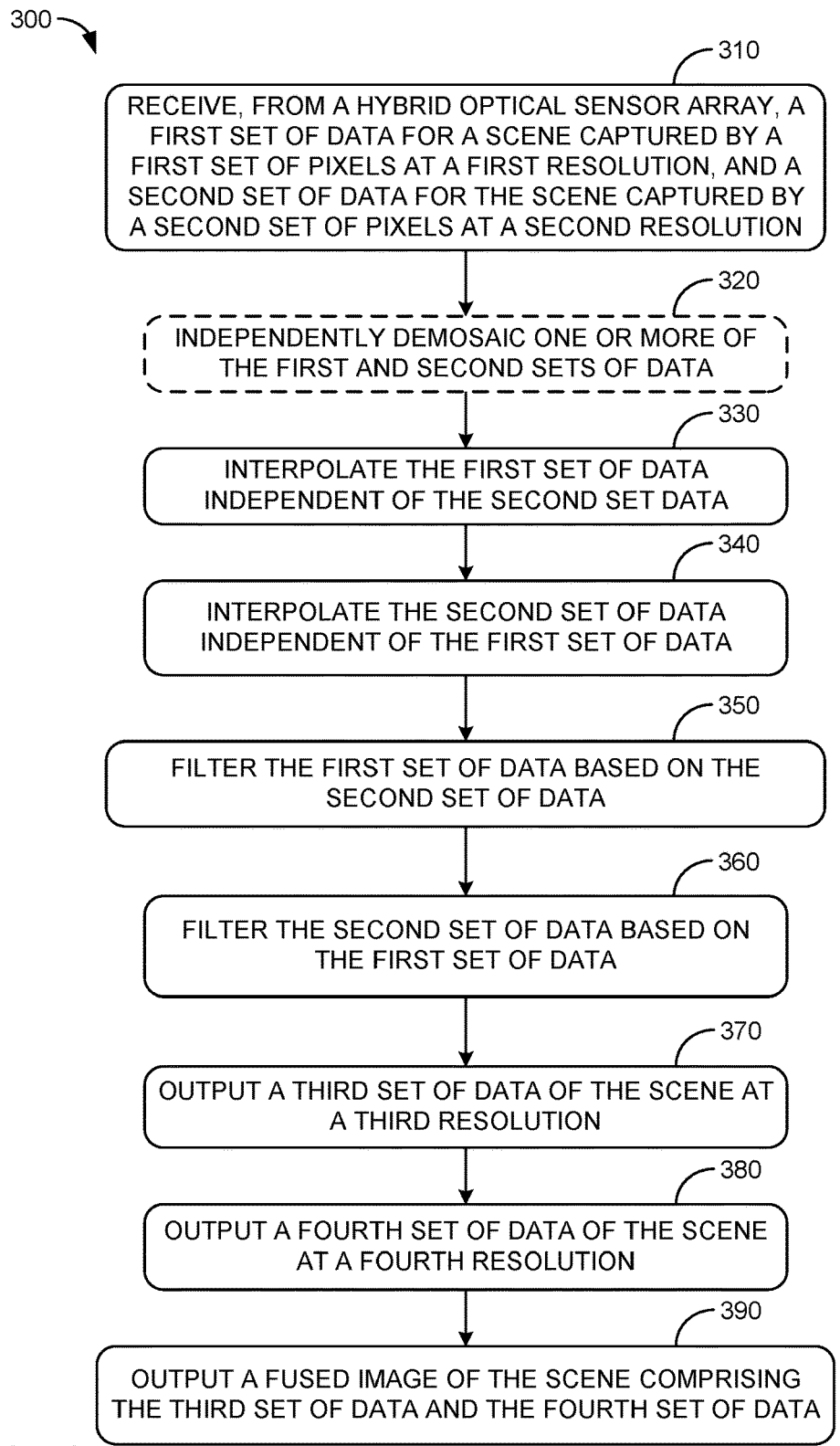
FIG. 3 shows a flowchart of an example method for generating full-resolution images for each of two subsets of pixels of a hybrid optical sensor array.

FIG. 3 depicts a flow chart for an example method 300 for generating full-resolution images for each of two subsets of pixels of a hybrid optical sensor array in accordance with an example of the present disclosure. Specifically, method 300 enables an imaging device to interpolate data from each of the two subsets of pixels independently, then to jointly filter the two interpolated data sets. In this way, two low-resolution images from a hybrid optical sensor array may be demosaiced into two full-resolution images. Method 300 will be described with reference to FIG. 4, which schematically illustrates image processing using the method of FIG. 3. Method 300, as well as subsequently described methods, will be primarily described with regards to a checkerboard-type hybrid optical sensor array, such as array 200, though it should be understood that method 300 and other methods herein are applicable to other array types and configurations. For example, FIGS. 7-9 will be described with regard to the application of method 300 to the RGB/IR hybrid optical sensor arrays depicted in FIGS. 2D and 2E.

At 310, method 300 includes receiving, from a hybrid optical sensor array, a first set of data for a scene captured by a first set of pixels at a first resolution, and a second set of data for a scene captured by a second set of pixels at a second resolution. As an example, the first set of data and second set of data may be captured concurrently. In some examples, the first resolution and second resolution may be equal. However, in other examples the first resolution may be greater or less than the second resolution. In some examples, the first and second data sets may be received as a single data set, and then separated into two separate data sets.

Figure 4:
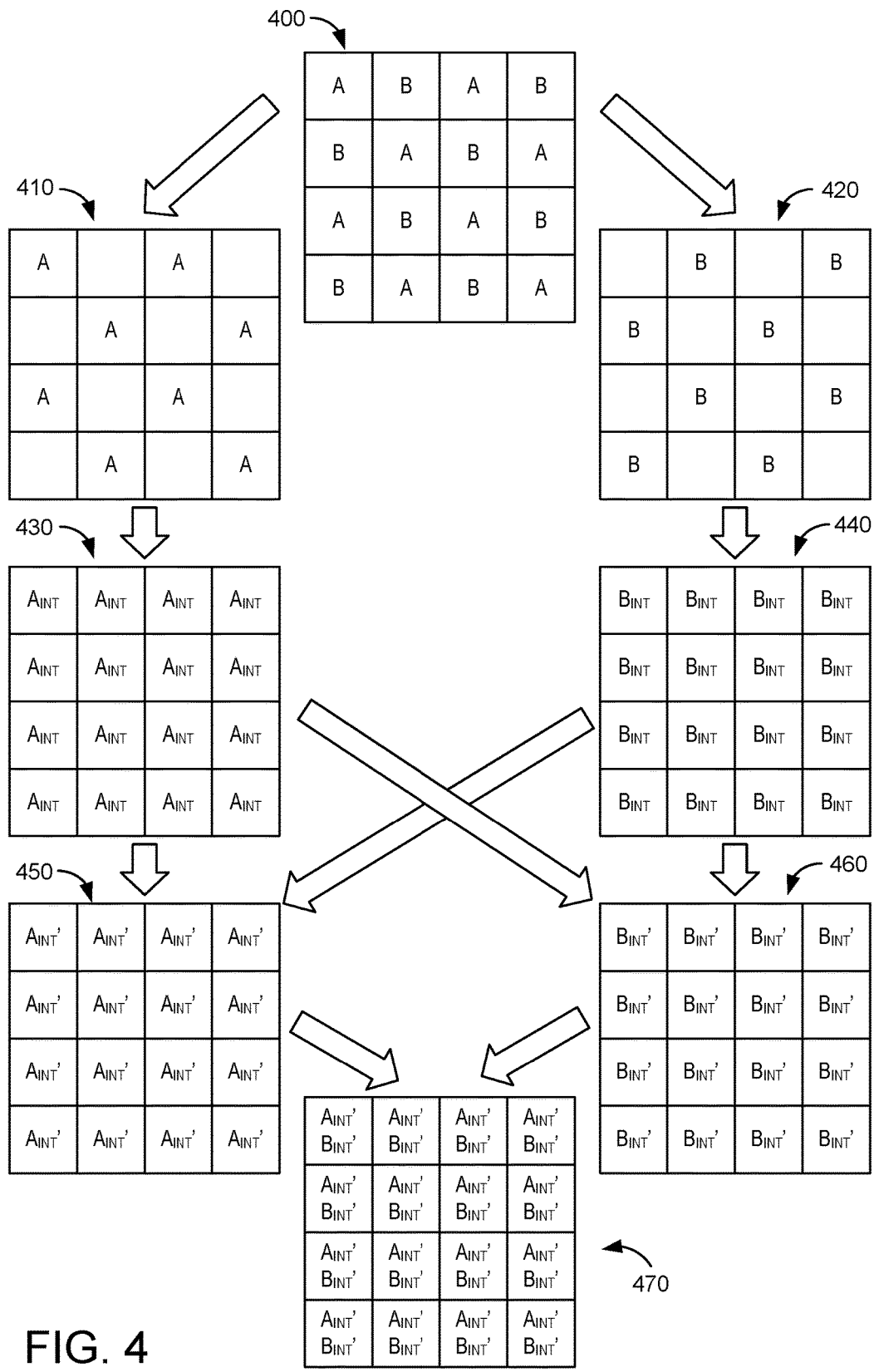
FIG. 4 schematically shows image processing using the method of FIG. 3.

Such an example is illustrated in FIG. 4. An initial data set is shown at 400, comprising data for a first set of pixels (A) interspersed with data for a second set of pixels (B). The initial data set is then parsed into a first data set 410 and a second data set 420. First data set 410 comprises data for the first set of pixels interspersed with null data points. Similarly, second data set 420 comprises data for the second set of pixels interspersed with null data points.

Continuing at 320, method 300 may optionally include independently demosaicing one or more of the first and second sets of data. For example, independent demosaicing may be applied to a set of data generated by a set of pixels comprising two or more pixel subsets. Such an example will be described further with regard to FIG. 7 as pertaining to a set of visible light pixels comprising Red, Green, and Blue pixel subsets.

Continuing at 330, method 300 includes interpolating the first set of data independent of the second set of data. At 340, method 300 includes interpolating the second set of data independent of the first set of data. As shown in FIG. 4, these processes result in an interpolated first set of data (shown at 430) and an interpolated second set of data (shown at 440). The interpolated sets of data have an increased resolution when compared with the initial data sets.

Independently interpolating a data set may be performed by numerous means. For example, each data set may be interpolated based on single channel upsampling. Single channel upsampling may be performed via bilinear interpolation, bicubic interpolation, spline interpolation, lanczos filtering, edge preserving filtering methods (e.g., bilateral filtering, guided filtering), among other suitable methods.

As another example, each data set may be interpolated based on spatial and/or spectral correlation, where gradients surrounding each data point are utilized to estimate values for neighboring null data points. For example, spatial correlation may be used when the values of neighboring data points are slowly varying. In such an example, a low-pass filter may be applied to the data set. Spatial information from the data set may be used to determine edge boundaries for the data set (e.g., regions where the difference in value between neighboring data points is greater than a threshold. Interpolation may then be applied within the detected edge boundaries.

As another example, each data set may be interpolated using adaptive homogeneity-directed interpolation, in which the direction of interpolation is actively selected. Such an interpolation approach may be applied to data from a scene including richly textured elements. Multi-spectral data may be used to more precisely locate data points at an edge more precisely so that an interpolation kernel may be selected adaptively to avoid artifacts. Interpolation is then performed in the direction of a gradient (e.g., an edge) rather than in all directions.

As an example, a data set may be interpolated twice using only a horizontal or vertical algorithm. A homogeneity measure may then be determined for each data point based on neighboring data points, thus indicating a directionality for the homogeneity. Interpolation may then be performed based on the greatest homogeneity directionality.

As an example, the variance of a data set may be determined for neighboring groups of data points. For example, variances may be determined horizontally (e.g., 2 directions), vertically (e.g., 2 directions), or both (e.g., 4 directions). A variance or homogeneity measurement may then be determined for each data point based on neighboring data points, thus indicating a directionality for the variance. Interpolation may then be performed directionally based on the least variance. In some examples, the method may be repeated using the newly interpolated values but without changing the original data points. A larger neighborhood of data points may be used in the first iteration and a smaller one in the second iteration.

Continuing at 340, method 300 includes filtering the first set of data based on the second set of data. At 350, method 300 includes filtering the second set of data based on the first set of data. As shown in FIG. 4, these processes result in a re-interpolated first set of data (shown at 450) and a re-interpolated second set of data (shown at 460). The interpolated sets of data have preserved edges with increased accuracy and continuity.

For example, the first and second data sets may be filtered based on a joint bilateral filter. For example, data, including gradients, from the first data set may be used as the guide for a guided filter to upsample the second data set. The second data set may then be utilized as an input to an edge-aware upsampling of the first data set. In this way, discontinuities between the data sets may be reduced, and edge accuracy may be increased.

Additionally or alternatively, the first and second data sets may be jointly filtered using adaptive homogeneity directed interpolation. For example, as described at 320 and 330, directional variance may be determined for the first data set and second data set. Average values for the first and second data sets may be determined. In some examples, a weighted average may be determined to decrease the influence of data points outside a data neighborhood. An interpolated value for a data point of the first data set may then be determined based on the average value for the first data set, the value for the corresponding data point of the second data set, and the average value for the second data set.

At 360, method 300 includes outputting, using the filtered first set of data, a third set of data of the scene at a third resolution, greater than the first resolution. At 370, method 300 includes outputting, using the filtered second set of data, a fourth set of data of the scene at a fourth resolution, greater than the second resolution (e.g., the data sets shown at 450 and 460). Continuing at 380, method 300 includes outputting a fused image of the scene comprising the third set of data and the fourth set of data. Such a data set is shown at 470 in FIG. 4. As shown for array 200, the first resolution and second resolutions may be equal when the first and second pixel subsets are equally interspersed. As such, the third and fourth resolutions may also be equal. In examples where the hybrid optical sensor array comprises exactly two subsets, the third and fourth resolutions may be equal to the sum of the first and second resolutions. The output images may thus be equivalent to "full" resolution images, despite the pixel subsets comprising fewer than a full resolution set of pixels.

Figure 5:
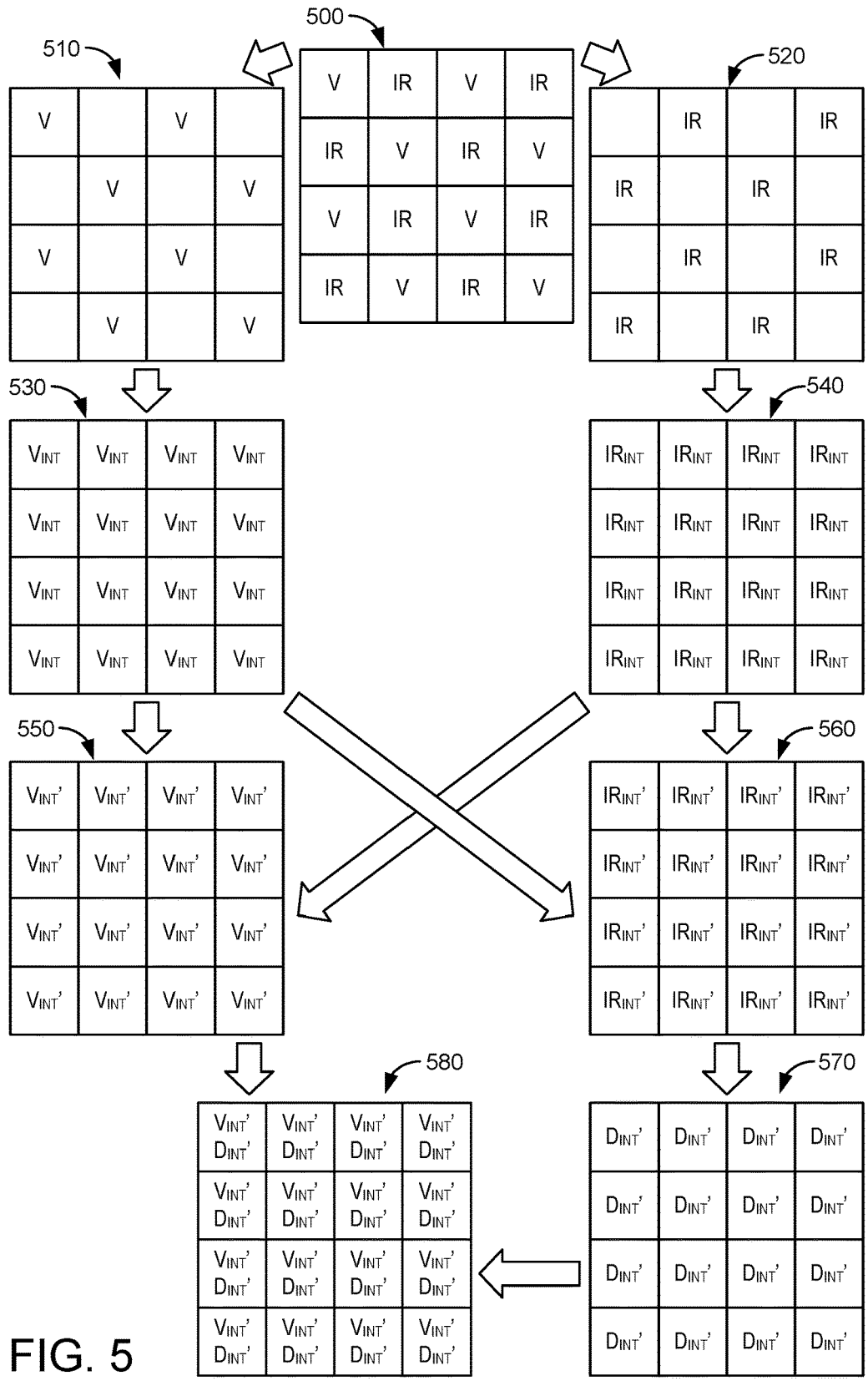
FIG. 5 schematically shows image processing for a visible/IR hybrid optical sensor array using the method of FIG. 3.

As an example, method 300 may be applied to a hybrid optical sensor array comprising visible light sensitive pixels and IR light sensitive pixels (e.g., array 200). An example for image processing in this way is schematically shown in FIG. 5. For example, visible light data of a scene at a first resolution and infrared data for a scene at a second resolution may be received. For example, an initial data set is shown at 500, comprising data for visible light sensitive pixels (V) interspersed with data for IR light sensitive pixels (IR). The initial data set is then parsed into a visible light data set 510 and an IR data set 520, each comprising data points for one data set interspersed with null data at points where data was received for the other data set.

The visible light data set may then be interpolated independently of the IR light data set, yielding the upsampled visible light data set shown at 530. Similarly, the IR light data set may then be interpolated independently of the visible light data set, yielding the upsampled IR light data set shown at 540. As described with regard 310 and 315, independent interpolation of each data set may comprise upsampling, spatial and/or spectral correlation, adaptive homogeneity-directed interpolation, and/or other suitable methods.

Next, the interpolated visible light data may be filtered based on the interpolated infrared light data, yielding the data set shown at 550. Similarly, the IR light data set may be filtered based on the visible light data set, yielding the data set shown at 540. For example, using a joint bilateral filter, the visible light data may be utilized as a guide for a guided filter applied to upsample the IR light data. The IR light data may then be used as the basis of an edge aware upsampling filter on the visible light data. Demosaiced visible light data of the scene may then be output at a third resolution, greater than the first resolution (e.g., the data set shown at 550), and demosaiced IR light data of the scene may then be output at a fourth resolution, greater than the second resolution (e.g., the data set shown at 560). In some examples, the demosaiced visible light data and demosaiced IR light data may be fused into a single image of the scene.

In examples where the hybrid optical sensor array is part of a depth camera, the IR light data may be used to determine depth data for the scene. As such, depth values may be indicated for the scene based on the demosaiced infrared light data, as shown at 570. In examples where TOF depth generation is used, and thus multiple IR subframes are input to generate depth maps, each IR subframe may receive equal weight to ensure that the depth values are not altered by the bilateral filtering. In other words, if a pixel intensity is changed within a subframe, the ratio of IR pixel readings may be maintained the same so as not to change the depth/reflectivity values for the frame. The resulting depth values for the scene may then be fused with the demosaiced visible light data for the scene for output, as shown at 580.

Alternatively, depth values for the scene may be calculated from the initial IR light data for the scene. For example, if structured light is used as the basis for depth calculations, higher fidelity depth data may be obtained if the IR data is not subject to interpolation and upsampling, as the structured light pattern may be altered during processing.

Figure 6:
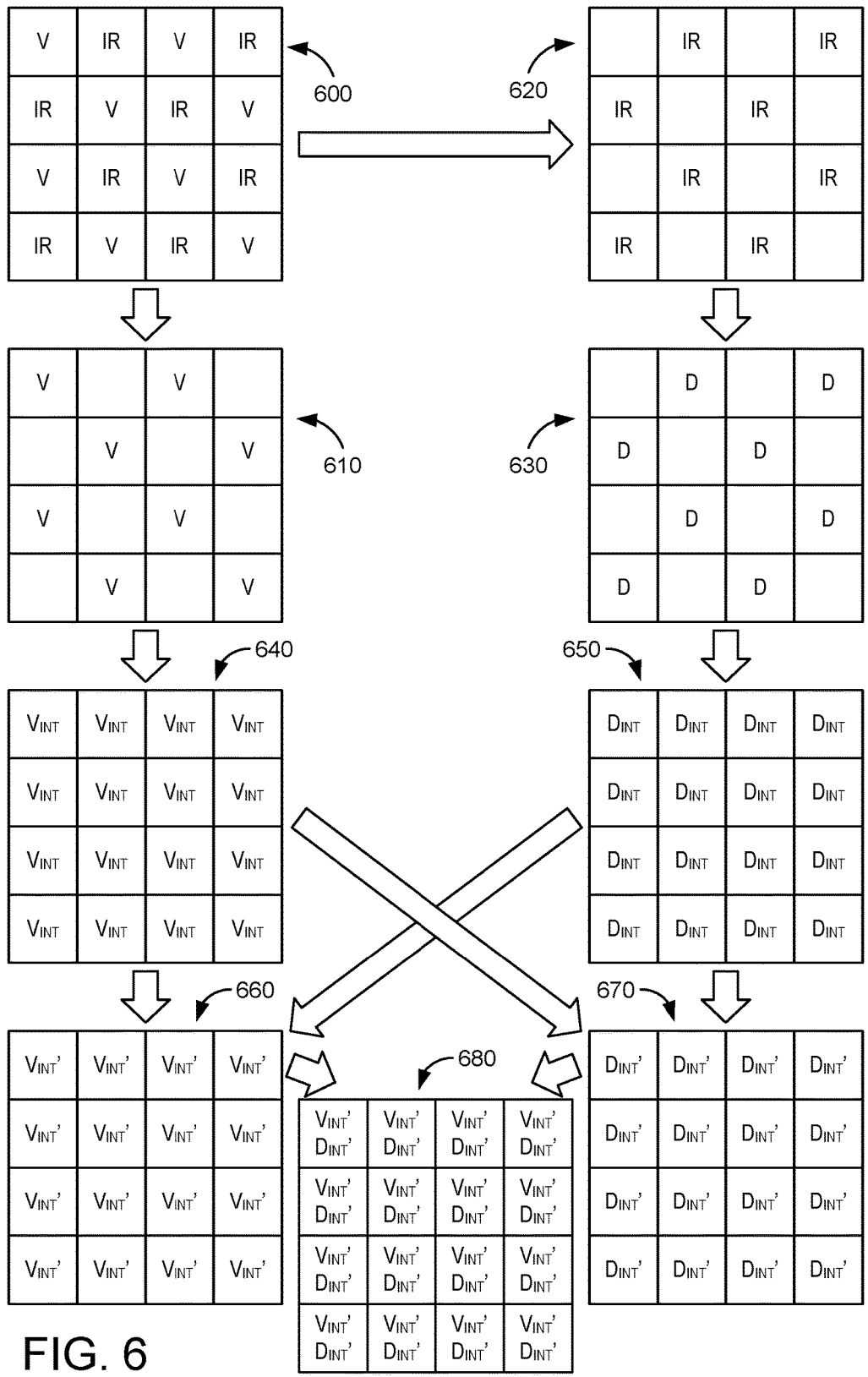
FIG. 6 schematically shows image processing for a visible/IR hybrid optical sensor array using the method of FIG. 3.

An example for image processing in this way is schematically shown in FIG. 6. For example, visible light data of a scene at a first resolution and infrared data for a scene at a second resolution may be received. For example, an initial data set is shown at 600, comprising data for visible light sensitive pixels (V) interspersed with data for IR light sensitive pixels (IR). The initial data set is then parsed into a visible light data set 610 and an IR data set 620, each comprising data points for one data set interspersed with null data at points where data was received for the other data set. Depth values may then be calculated for each IR light data point, as shown at 630.

The visible light data set may then be interpolated independently of the depth value data set, yielding the upsampled visible light data set shown at 640. Similarly, the depth value data set may then be interpolated independently of the visible light data set, yielding the upsampled depth value data set shown at 650. As described with regard 330 and 340, independent interpolation of each data set may comprise upsampling, spatial and/or spectral correlation, adaptive homogeneity-directed interpolation, and/or other suitable methods.

Next, the interpolated visible light data may be filtered based on the interpolated depth value data, yielding the data set shown at 660. Similarly, the depth value data set may then be filtered based on the visible light data set, yielding the data set shown at 670. For example, using a joint bilateral filter, the visible light data may be utilized as a guide for a guided filter applied to upsample the depth value data. The depth value data may then be used as the basis of an edge aware upsampling filter on the visible light data.

The inputs to the filter may be directly based on the visible light and infrared light data, or may be indirectly based on the visible light and infrared light data (e.g., depth, depth confidence, reflectivity, active brightness). In some examples, both the depth values and IR light values may be used as the basis for interpolating the visible light data set. Along with the initial values, active brightness, reflectivity, and depth value confidence can be used as inputs, thus increasing the fidelity of the interpolated visible light data set. For example, active brightness (based on the IR light data) may be used to generate a line at a boundary where the visible light data demonstrates a zippering effect. Such a scenario may occur with high visible background light (e.g., sunlight). Conversely, if the IR light data set has a high return, the depth value confidence at the edges of an object may be relatively low. If the interior portions of the object have relatively high depth value confidence, the visible light data may be used to set an edge boundary, and then depth values may be interpolated for the entire object based on the high confidence depth values.

Demosaiced visible light data of the scene may then be output at a third resolution, greater than the first resolution (e.g., the data set shown at 660), and demosaiced depth value data of the scene may then be output at a fourth resolution, greater than the second resolution (e.g., the data set shown at 670). In some examples, the demosaiced visible light data and demosaiced depth value data may be fused into a single image of the scene.

Figure 7:
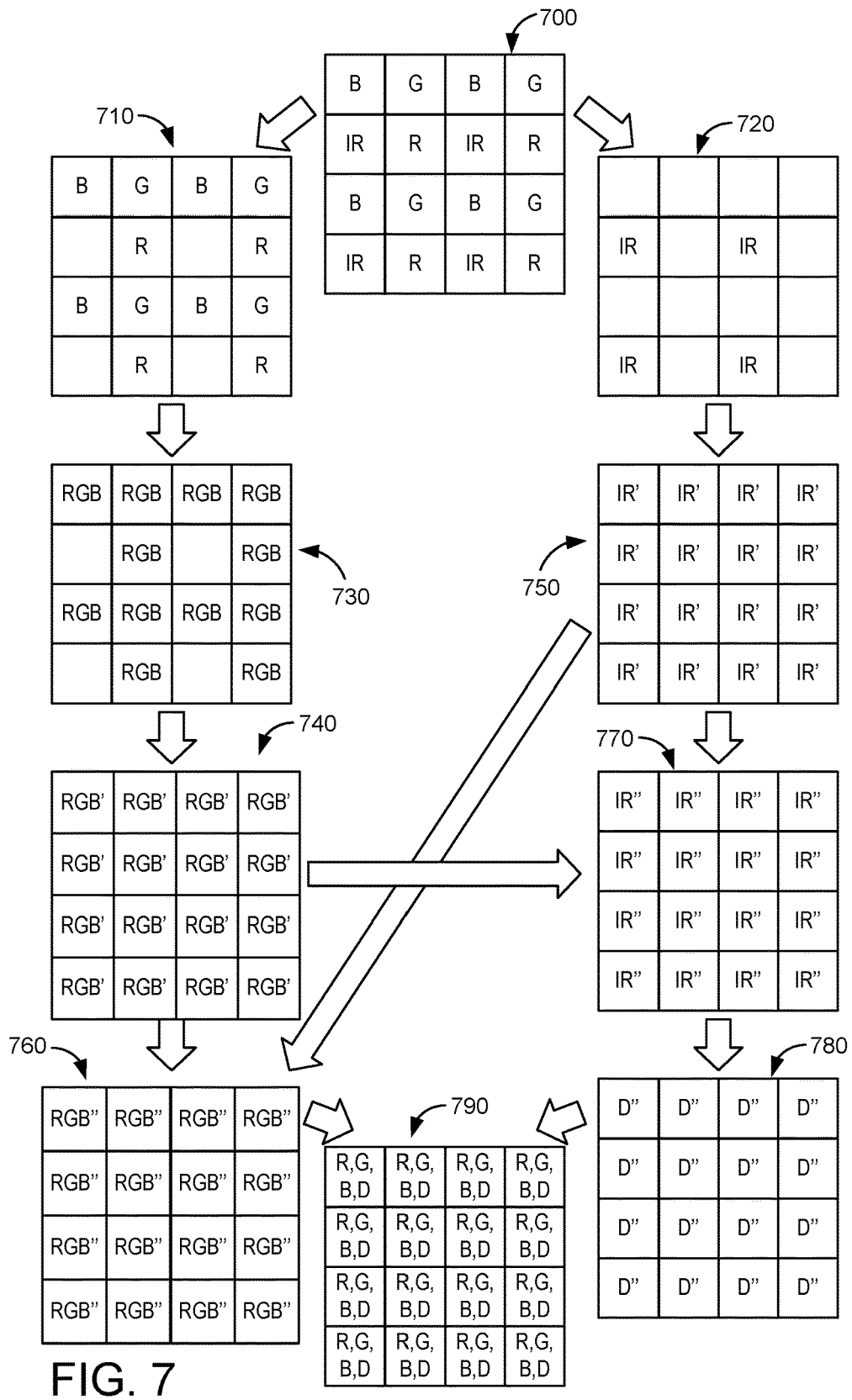
FIG. 7 schematically shows image processing for an RGB/IR hybrid optical sensor array using the method of FIG. 3.

As another example, method 300 may be applied to a hybrid optical sensor array comprising RGB visible light sensitive pixels and IR light sensitive pixels (e.g., array 260). An example for image processing in this way is schematically shown in FIG. 7. Visible light data of a scene at a first resolution and infrared data for a scene at a second resolution may be received at a RGB/IR hybrid optical sensor. For example, an initial data set is shown at 700, comprising data for RGB visible light sensitive pixels (R), (G), & (B) interspersed with data for IR light sensitive pixels (IR). The initial data set is then parsed into an RGB data set 710 and an IR data set 720, each comprising data points for one data set interspersed with null data at points where data was received for the other data set. In this example, the RGB data set is higher in resolution than the IR data set.

The RGB data set 710 may then be demosaiced independently of IR data set 720, yielding demosaiced data set 730. The RGB data set may then be interpolated independently of the IR light data set, yielding the upsampled RGB data set shown at 740. Similarly, the IR light data set may then be interpolated independently of the visible light data set, yielding the upsampled IR light data set shown at 750. As described with regard to 330 and 340, independent interpolation of each data set may comprise upsampling, spatial and/or spectral correlation, adaptive homogeneity-directed interpolation, and/or other suitable methods.

Next, the interpolated RGB data may be filtered based on the interpolated infrared light data, yielding the data set shown at 760. Similarly, the IR light data set may then be filtered based on the RGB data set, yielding the data set shown at 770. For example, using a joint bilateral filter, the RGB data may be utilized as a guide for a guided filter applied to upsample the IR light data. The IR light data may then be used as the basis of an edge aware upsampling filter on the RGB data. Demosaiced RGB data of the scene may then be output at a third resolution, greater than the first resolution (e.g., the data set shown at 760), and demosaiced IR light data of the scene may then be output at a fourth resolution, greater than the second resolution (e.g., the data set shown at 770). In some examples, the demosaiced RGB data and demosaiced IR light data may be fused into a single image of the scene.

In examples where the hybrid optical sensor array is comprised in a depth camera, the IR light data may be used to determine depth data for the scene. As such, depth values may be indicated for the scene based on the demosaiced infrared light data, as shown at 780. The resulting depth values for the scene may then be fused with the demosaiced RGB data for the scene for output, as shown at 790. In this way, the originally low resolution IR data and subsequent depth map may use spatial information from the RGB image to generate a high resolution RGB+Depth data set.

Figure 8:
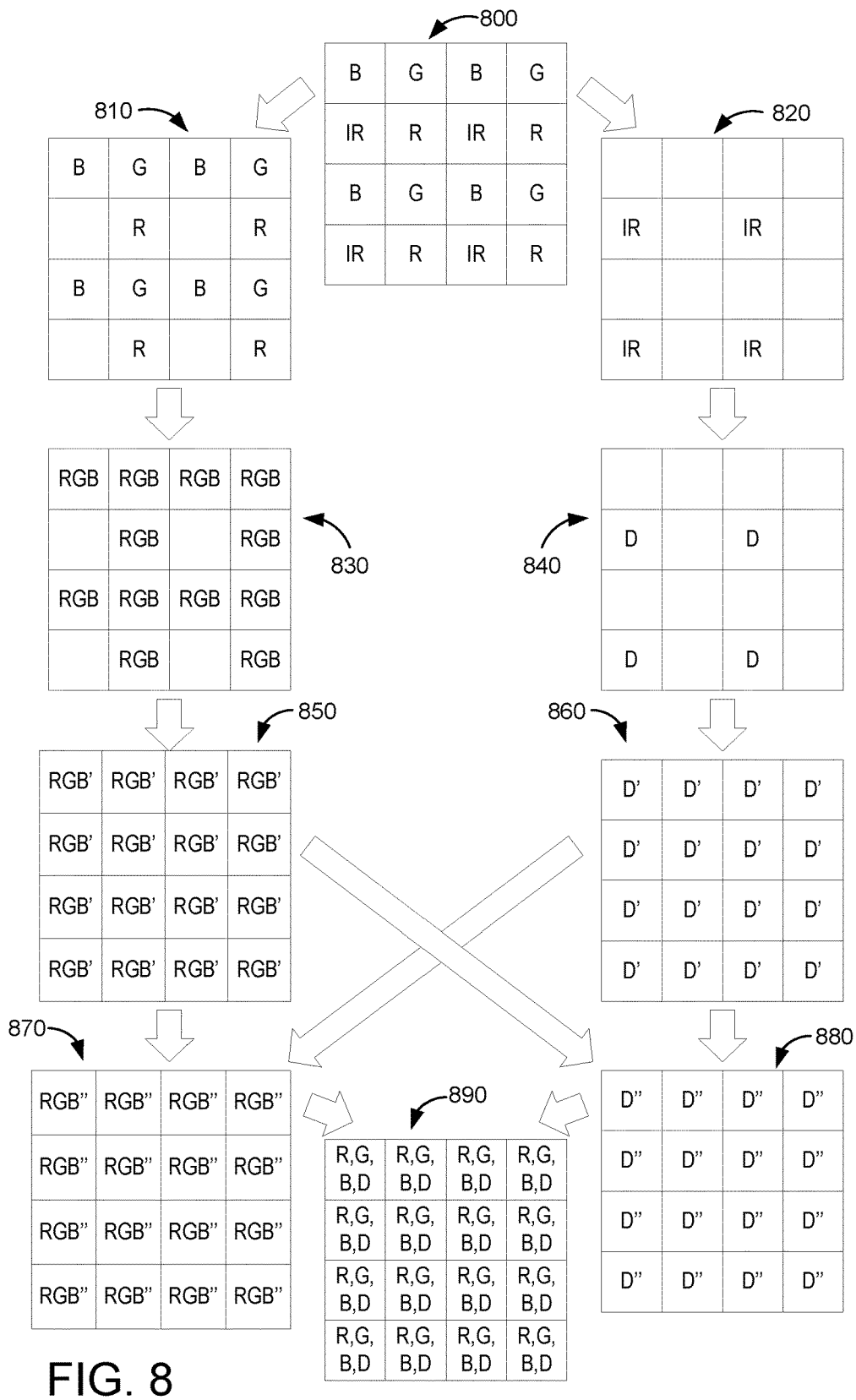
FIG. 8 schematically shows image processing for an RGB/IR hybrid optical sensor array using the method of FIG. 3.

Alternatively, depth values for the scene may be calculated from the initial IR light data for the scene. An example for image processing in this way is schematically shown in FIG. 8. For example, RGB data of a scene at a first resolution and infrared data for a scene at a second resolution may be received. For example, an initial data set is shown at 800, comprising data for RGB sensitive pixels (R), (C), & (B) interspersed with data for IR light sensitive pixels (IR). The initial data set is then parsed into an RGB data set 810 and an IR data set 820, each comprising data points for one data set interspersed with null data at points where data was received for the other data set.

The RGB data set 810 may then be demosaiced independently of IR data set 820, yielding demosaiced data set 830. Depth values may then be calculated for each IR light data point, independently from the RGB data, as shown at 840. The RGB data set may then be interpolated independently of the depth value data set, yielding the upsampled RGB data set shown at 850. Similarly, the depth value data set may then be interpolated independently of the RGB data set, yielding the upsampled depth value data set shown at 860. As described with regard to 330 and 340, independent interpolation of each data set may comprise upsampling, spatial and/or spectral correlation, adaptive homogeneity-directed interpolation, and/or other suitable methods.

Next, the interpolated RGB data may be filtered based on the interpolated depth value data, yielding the data set shown at 870. Similarly, the depth value data set may then be filtered based on the RGB data set, yielding the data set shown at 880. For example, using a joint bilateral filter, the RGB data may be utilized as a guide for a guided filter applied to upsample the depth value data. The depth value data may then be used as the basis of an edge aware upsampling filter on the RGB data.

The inputs to the filter may be directly based on the RGB and infrared light data, or may be indirectly based on the RGB and infrared light data (e.g., depth, depth confidence, reflectivity, active brightness). In some examples, both the depth values and IR light values may be used as the basis for interpolating the RGB data set. Along with the initial values, active brightness, reflectivity, and depth value confidence can be used as inputs, thus increasing the fidelity of the interpolated visible light data set.

Demosaiced RGB data of the scene may then be output at a third resolution, greater than the first resolution (e.g., the data set shown at 870), and demosaiced depth value data of the scene may then be output at a fourth resolution, greater than the second resolution (e.g., the data set shown at 880). In some examples, the demosaiced visible light data and demosaiced depth value data may be fused into a single image of the scene (e.g., the data set shown at 890).

In the examples shown in both FIGS. 7 and 8, the initial RGB resolution is greater than the initial IR resolution by a ratio of 3:1. As such, if the resolution of the RGB/IR hybrid optical sensor is n, the initial RGB resolution is 3n/4 and the initial IR resolution is n/4. Processing the two data sets using the method of FIG. 3, yields an RGB image with a resolution of n and an IR (and/or depth) image with a resolution of n.

Figure 9:
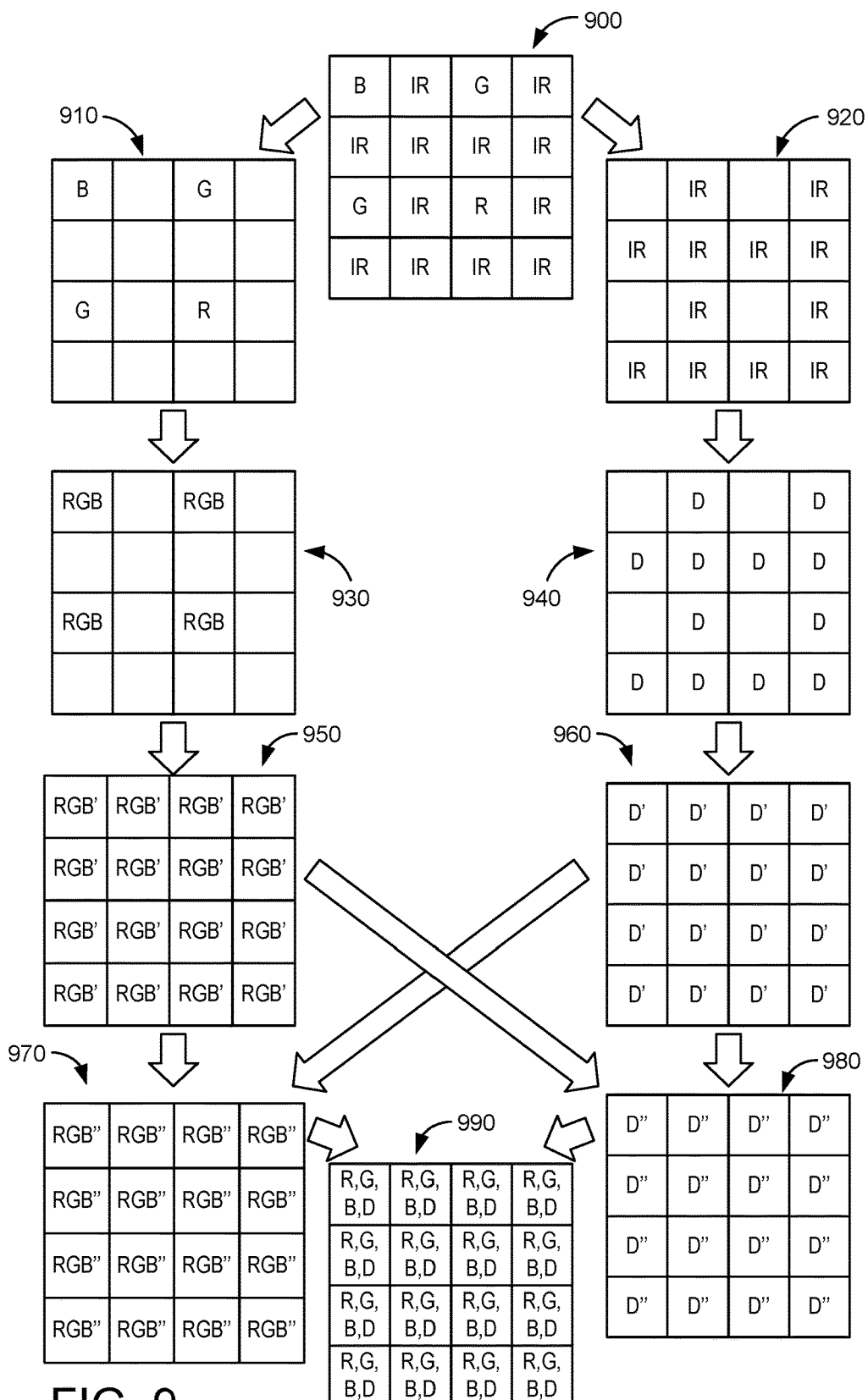
FIG. 9 schematically shows image processing for an RGB/IR hybrid optical sensor array using the method of FIG. 3.

In another example, the initial IR resolution may be greater than the initial RGB resolution by a ratio of 3:1, as shown in FIG. 2E. An example for image processing in this way is schematically shown in FIG. 9. For example, RGB data of a scene at a first resolution and infrared data for a scene at a second resolution may be received. For example, an initial data set is shown at 900, comprising data for RGB sensitive pixels (R), (G), & (B) interspersed with data for IR light sensitive pixels (IR). The initial data set is then parsed into an RGB data set 910 and an IR data set 920, each comprising data points for one data set interspersed with null data at points where data was received for the other data set.

The RGB data set 910 may then be demosaiced independently of IR data set 920, yielding demosaiced data set 930. Depth values may then be calculated for each IR light data point, independently from the RGB data, as shown at 940. The RGB data set may then be interpolated independently of the depth value data set, yielding the upsampled RGB data set shown at 950. Similarly, the depth value data set may then be interpolated independently of the RGB data set, yielding the upsampled depth value data set shown at 960.

Next, the interpolated RGB data may be filtered based on the interpolated depth value data, yielding the data set shown at 970. Similarly, the depth value data set may then be filtered based on the RGB data set, yielding the data set shown at 980. For example, the high resolution depth data may be used to provide filtering guidance to the RGB data.

The inputs to the filter may be directly based on the RGB and infrared light data, or may be indirectly based on the RGB and infrared light data (e.g., depth, depth confidence, reflectivity, active brightness). The use of active brightness and depth as inputs to the demosaicing filter allows for the reporting of full resolution depth and RGB images that maintain feature fidelity and preserve edges with minimal artifacts to either image.

Demosaiced RGB data of the scene may then be output at a third resolution, greater than the first resolution (e.g., the data set shown at 970), and demosaiced depth value data of the scene may then be output at a fourth resolution, greater than the second resolution (e.g., the data set shown at 980). In some examples, the demosaiced visible light data and demosaiced depth value data may be fused into a single image of the scene (e.g., the data set shown at 990). In this example, if the resolution of the RGB/IR hybrid optical sensor is n, the initial RGB resolution is n/4 and the initial IR resolution is 3n/4. Processing the two data sets using the method of FIG. 3, yields an RGB image with a resolution of n and an IR (and/or depth) image with a resolution of n. While the example depicted in FIG. 9 depicts depth value data being generated from the initial IR data set, in other examples, depth value data may be generated from the demosaiced IR data, similar to the example depicted in FIG. 7.

Figure 10:
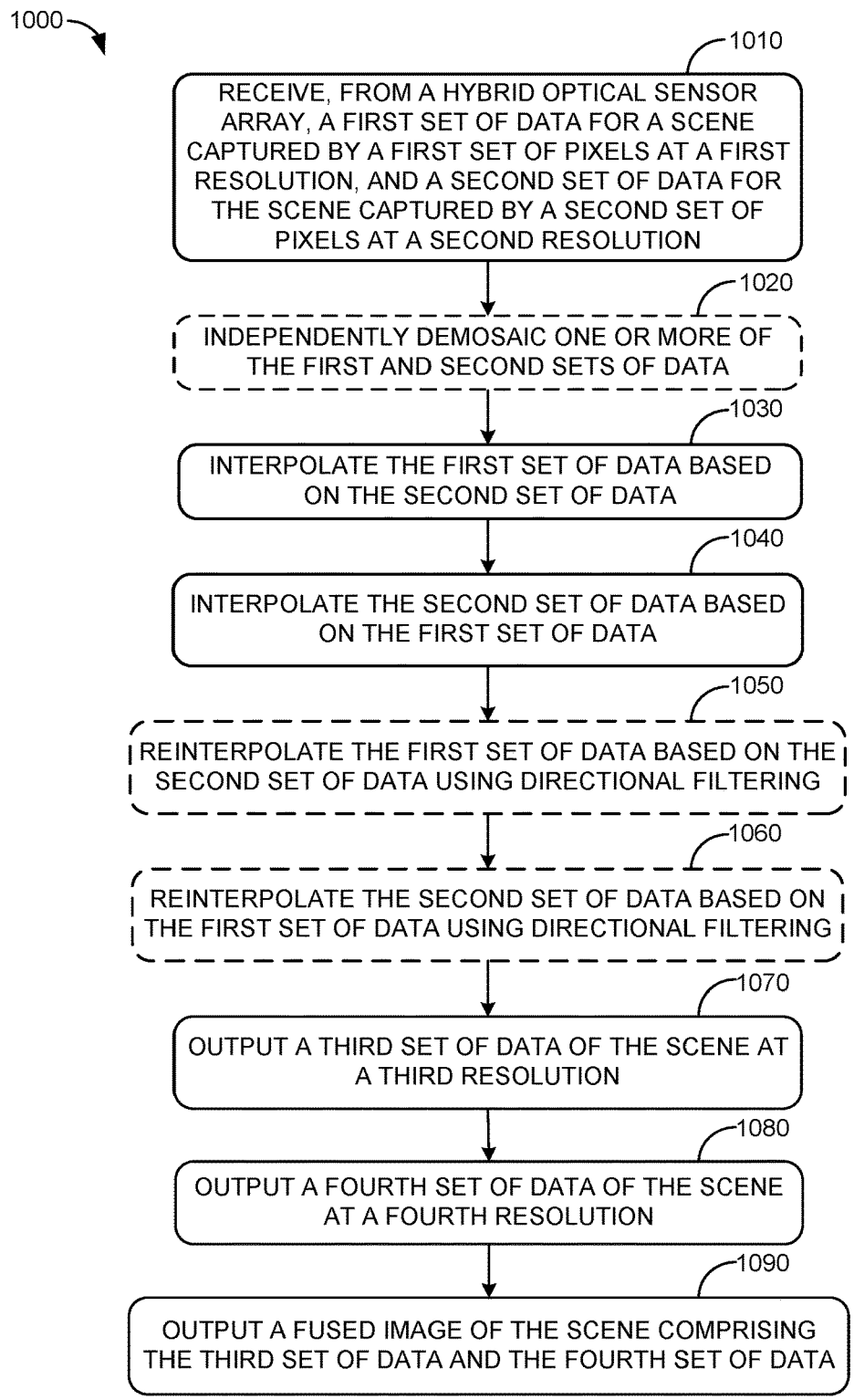
FIG. 10 shows a flowchart of an example method for generating full-resolution images for each of two subsets of pixels of a hybrid optical sensor array.

FIG. 10 depicts a flow chart for an additional example method 1000 for generating full-resolution images for each of two subsets of pixels of a hybrid optical sensor array in accordance with an example of the present disclosure. Specifically, method 1000 enables an imaging device to jointly interpolate data from each of the two subsets of pixels, then to jointly re-interpolate the two interpolated data sets. In this way, two low-resolution images from a hybrid optical sensor array may be demosaiced into two full-resolution images. Method 1000 will be described with reference to FIG. 11, which schematically illustrates image processing using the method of FIG. 10.

At 1010, method 1000 includes receiving, from a hybrid optical sensor array, a first set of data for a scene captured by a first set of pixels at a first resolution, and a second set of data for a scene captured by a second set of pixels at a second resolution. As an example, the first set of data and second set of data may be captured concurrently. In some examples, the first resolution and second resolution may be equal. However, in other examples the first resolution may be greater or less than the second resolution. In some examples, the first and second data sets may be received as a single data set, and then separated into two separate data sets.

Figure 11:
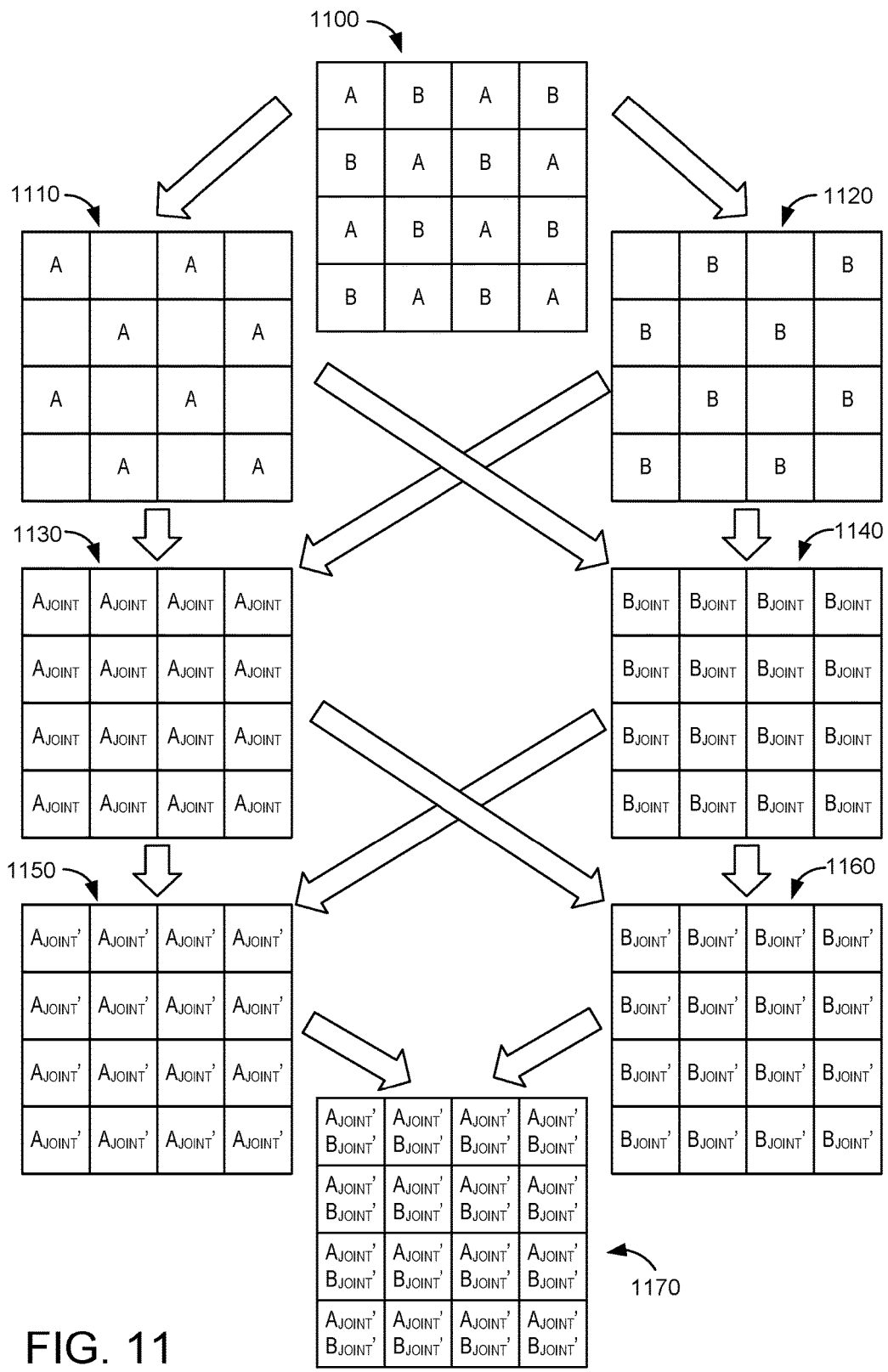
FIG. 11 schematically shows image processing using the method of FIG. 10.

Such an example is illustrated in FIG. 11. An initial data set is shown at 1100, comprising data for a first set of pixels (A) interspersed with data for a second set of pixels (B). The initial data set is then parsed into a first data set 1110 and a second data set 1120. First data set 1110 comprises data for the first set of pixels interspersed with null data points. Similarly, second data set 1120 comprises data for the second set of pixels interspersed with null data points.

Continuing at 1020, method 1000 may optionally include independently demosaicing one or more of the first and second sets of data, as described with regards to FIGS. 7-9. Further examples will be described with regard to FIGS. 14-16.

Continuing at 1030, method 1000 includes interpolating the first set of data based on the second set of data. At 1040, method 1000 includes interpolating the second set of data based on the first set of data. As shown in FIG. 11, these processes result in a joint-interpolated first set of data (shown at 1130) and a joint-interpolated second set of data (shown at 1140). The jointly interpolated sets of data have an increased resolution when compared with the initial data sets.

Jointly interpolating two data sets may be performed by numerous means. For example, gradients and discontinuities may be determined for data values in each data set. Interpolated values for the first data set may then be determined based on the values, gradients, and/or discontinuities of the second data set. For example, values may be weighted more heavily along a gradient, and less heavily at a discontinuity. Similarly, interpolated values for the second data set may then be determined based on the values, gradients, and/or discontinuities of the first data set.

Continuing at 1050, method 1000 includes re-interpolating the first set of data based on the second set of data using directional filtering. At 1060, method 1000 includes re-interpolating the second set of data based on the first set of data using directional filtering. As described with regard to FIG. 3, directional filtering may include determining a variance or homogeneity measure for each data point based on neighboring data points, thus indicating a directionality for the variance. Interpolation may then be performed directionally based on the least variance. As shown in FIG. 11, these processes result in a joint-reinterpolated first set of data (shown at 1150) and a joint-reinterpolated second set of data (shown at 1160).

At 1070, method 1000 includes outputting, using the re-interpolated first set of data, a third set of data of the scene at a third resolution, greater than the first resolution. At 1080, method 1000 includes outputting, using the re-interpolated second set of data, a fourth set of data of the scene at a fourth resolution, greater than the second resolution (e.g., the data sets shown at 1150 and 1160). Continuing at 1090, method 1000 includes outputting a fused image of the scene comprising the third set of data and the fourth set of data. Such a data set is shown at 1170 in FIG. 11.

Figure 12:
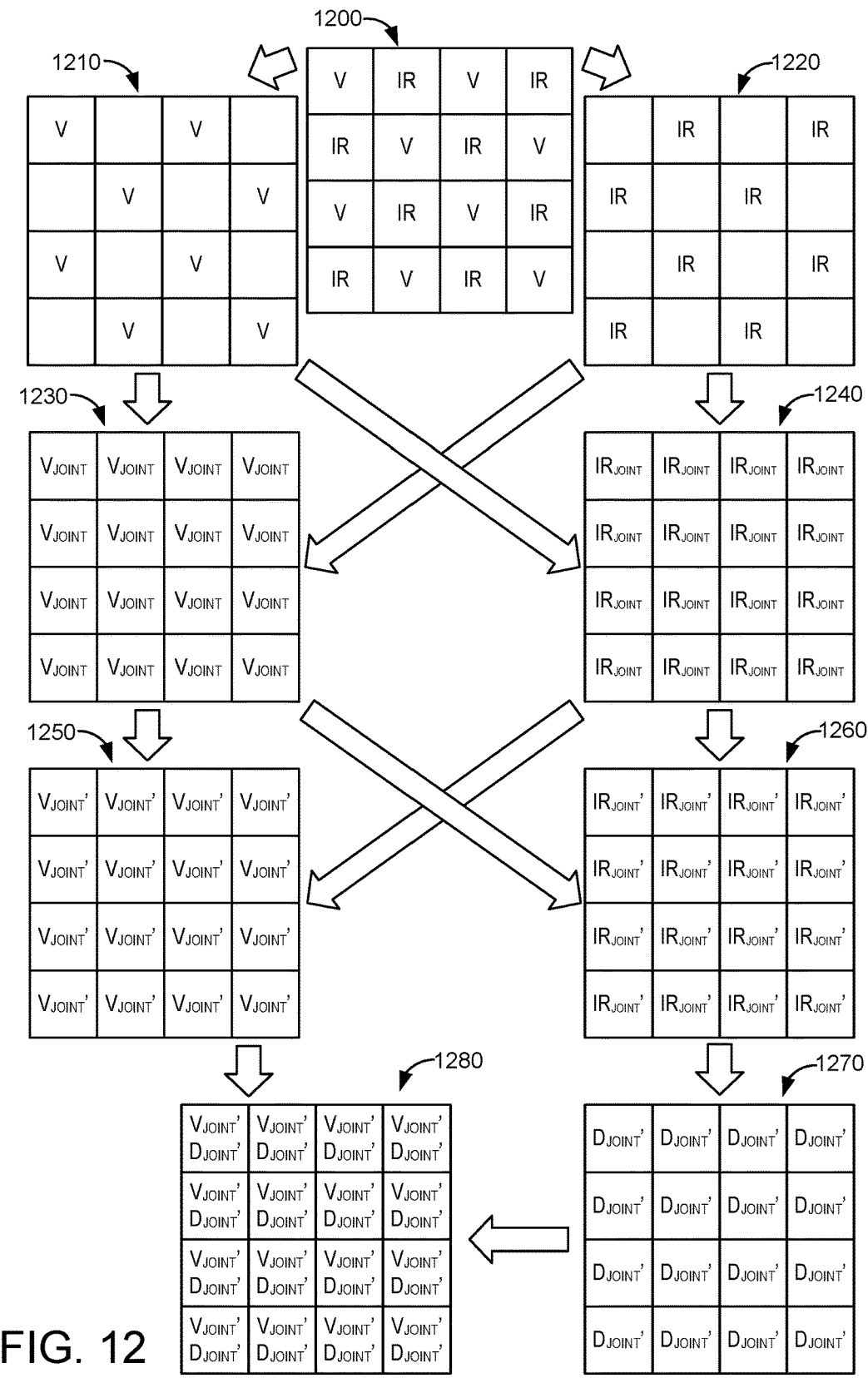
FIG. 12 schematically shows image processing for a visible/IR hybrid optical sensor array using the method of FIG. 10.

As an example, method 1000 may be applied to a hybrid optical sensor array comprising visible light sensitive pixels and IR light sensitive pixels (e.g., array 200). An example for image processing in this way is schematically shown in FIG. 12. For example, visible light data of a scene at a first resolution and infrared data for a scene at a second resolution may be received. For example, an initial data set is shown at 1200, comprising data for visible light sensitive pixels (V) interspersed with data for IR light sensitive pixels (IR). The initial data set is then parsed into a visible light data set 1210 and an IR data set 1220, each comprising data points for one data set interspersed with null data at points where data was received for the other data set.

The visible light data set may then be interpolated based on the IR light data set, yielding the upsampled visible light data set shown at 1230. Similarly, the IR light data set may then be interpolated based on the visible light data set, yielding the upsampled IR light data set shown at 1240. As described with regard to 1030 and 1040, joint interpolation of each of the first and second data sets may be based on the values, gradients, and/or discontinuities of the other data set. For example, luminance gradients and discontinuities may be determined for the IR light data and the visible light data based on active brightness and luminance.

Next, the visible light data set may then be reinterpolated based on the IR light data set, yielding the visible light data set shown at 1250. Similarly, the IR light data set may then be reinterpolated based on the visible light data set, yielding the IR light data set shown at 1260. As described with regard to 1050 and 1060, joint reinterpolation of each of the first and second data sets may be based on directional filtering of each data set. Demosaiced visible light data of the scene may then be output at a third resolution, greater than the first resolution (e.g., the data set shown at 1250), and demosaiced IR light data of the scene may then be output at a fourth resolution, greater than the second resolution (e.g., the data set shown at 1260). In some examples, the demosaiced visible light data and demosaiced IR light data may be fused into a single image of the scene. In examples where the hybrid optical sensor array is comprised in a depth camera, the IR light data may be used to determine depth data for the scene. As such, depth values may be indicated for the scene based on the demosaiced infrared light data, as shown at 1270. The resulting depth values for the scene may then be fused with the demosaiced visible light data for the scene for output, as shown at 1280.

Figure 13:
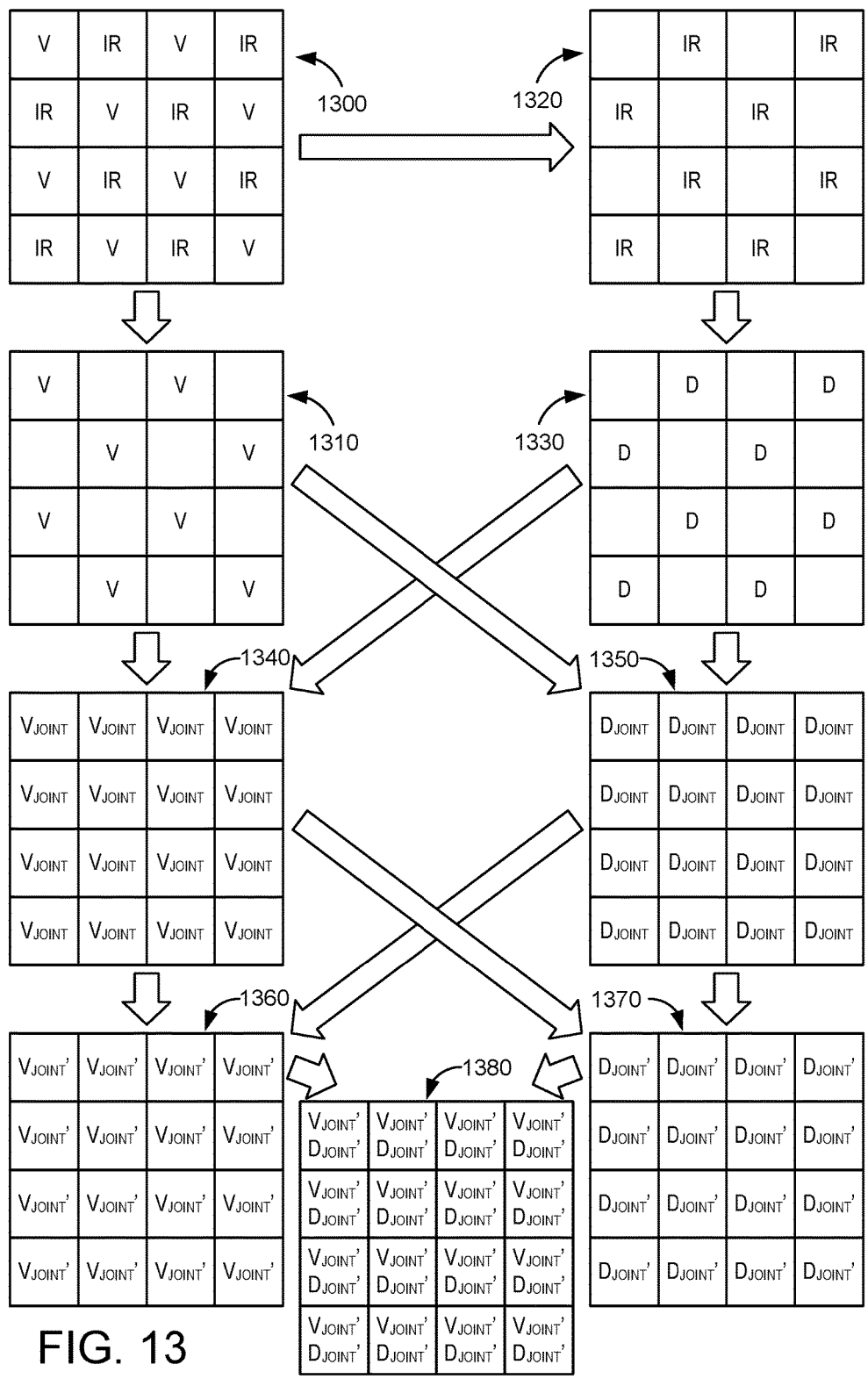
FIG. 13 schematically shows image processing for a visible/IR hybrid optical sensor array using the method of FIG. 10.

Alternatively, depth values for the scene may be calculated from the initial IR light data for the scene. An example for image processing in this way is schematically shown in FIG. 13. For example, visible light data of a scene at a first resolution and infrared data for a scene at a second resolution may be received. For example, an initial data set is shown at 1300, comprising data for visible light sensitive pixels (V) interspersed with data for IR light sensitive pixels (IR). The initial data set is then parsed into a visible light data set 1310 and an IR data set 1320, each comprising data points for one data set interspersed with null data at points where data was received for the other data set. Depth values may then be calculated for each IR light data point, as shown at 1330.

The visible light data set may then be interpolated based on the depth value data set, yielding the upsampled visible light data set shown at 1340. Similarly, the IR light data set may then be interpolated based on the visible light data set, yielding the upsampled depth value data set shown at 1350.

As described with regard to 1030 and 1040, joint interpolation of each of the first and second data sets may be based on the values, gradients, and/or discontinuities of the other data set. For example, differences between IR light data and visible light data may vary gradually, enabling the application of a low-pass filter. Interpolation may be applied within determined edge boundaries. Then, spatial information from depth values, IR light data and visible light data may be used to refine edge boundaries.

Next, the visible light data set may be reinterpolated based on the depth value data set, yielding the visible light data set shown at 1360. Similarly, the depth value data set may then be reinterpolated based on the visible light data set, yielding the depth value data set shown at 1370. As described with regard to 1050 and 1060, joint reinterpolation of each of the visible light and depth value data sets may be based on directional filtering of each data set. Demosaiced visible light data of the scene may then be output at a third resolution, greater than the first resolution (e.g., the data set shown at 1360), and demosaiced depth value data of the scene may then be output at a fourth resolution, greater than the second resolution (e.g., the data set shown at 1370). The demosaiced depth values for the scene may then be fused with the demosaiced visible light data for the scene for output, as shown at 1380.

Figure 14:
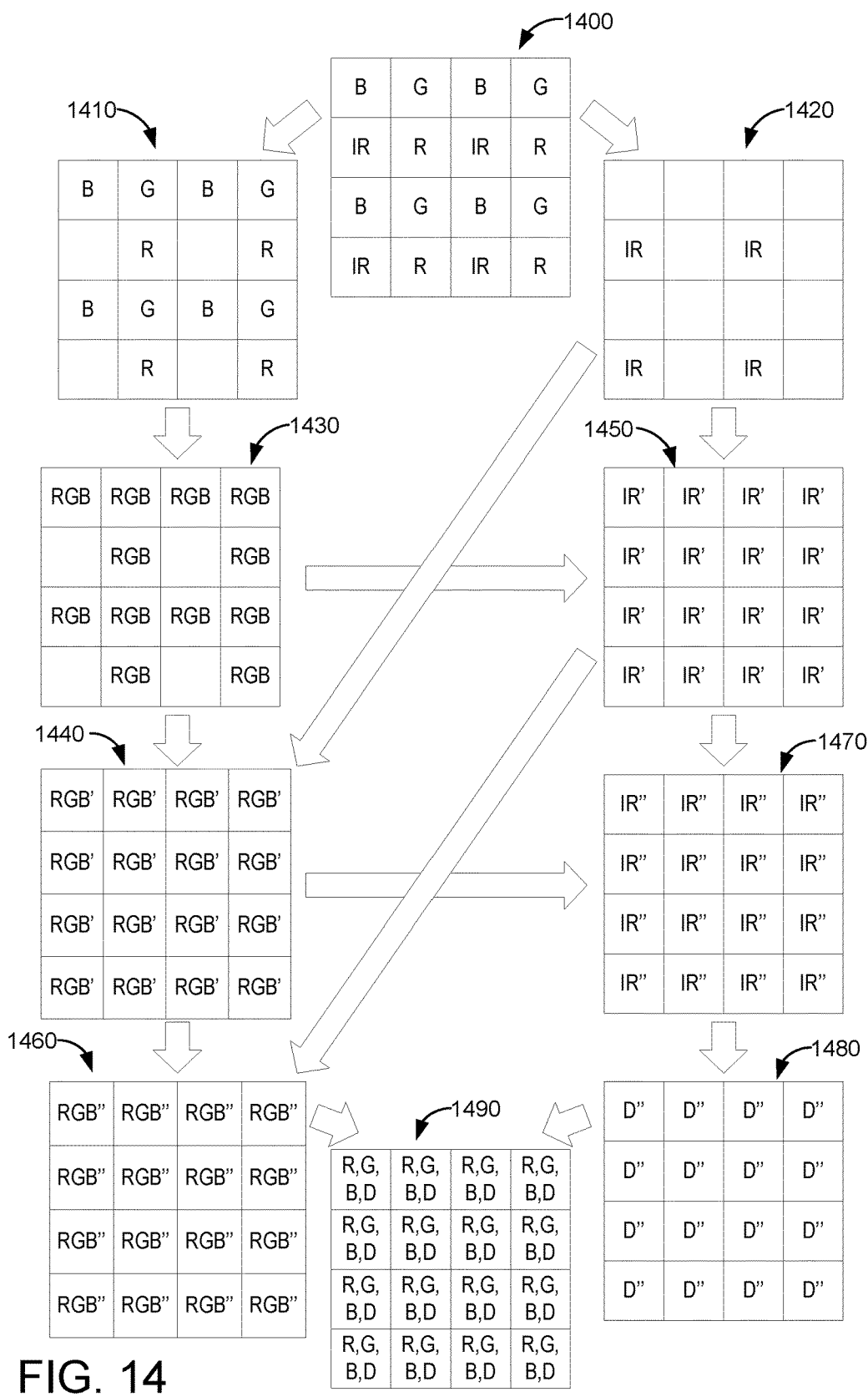
FIG. 14 schematically shows image processing for an RGB/IR hybrid optical sensor array using the method of FIG. 10.

As an example, method 1000 may be applied to a hybrid optical sensor array comprising RGB visible light sensitive pixels and IR light sensitive pixels (e.g., array 260). An example for image processing in this way is schematically shown in FIG. 14. For example, RGB data of a scene at a first resolution and infrared data for a scene at a second resolution may be received at a RGB/IR hybrid optical sensor. For example, an initial data set is shown at 1400, comprising data for RGB visible light sensitive pixels (R), (G), & (B) interspersed with data for IR light sensitive pixels (IR). The initial data set is then parsed into an RGB data set. 1410 and an IR data set 1420, each comprising data points for one data set interspersed with null data at points where data was received for the other data set. In this example, the RGB data set is higher in resolution than the IR data set.

The RGB data set 1410 may then be demosaiced independently of IR data set 1420, yielding demosaiced data set 1430. In some examples, the IR data set may also be demosaiced based on active brightness, independently of the RGB data set (not shown). The RGB data set may then be interpolated based on the IR light data set, yielding the upsampled RGB data set shown at 1440. Similarly, the IR light data set may then be interpolated based on the RGB data set, yielding the upsampled IR light data set shown at 1450. As described with regard to 1030 and 1040, joint interpolation of each of the first and second data sets may be based on the values, gradients, and/or discontinuities of the other data set. For example, luminance gradients and discontinuities may be determined for the IR light data and the visible light data based on active brightness and luminance.

Next, the RGB data set may then be reinterpolated based on the IR light data set, yielding the RGB data set shown at 1460. Similarly, the IR light data set may then be reinterpolated based on the visible light data set, yielding the IR light data set shown at 1470. As described with regard to 1050 and 1060, joint reinterpolation of each of the first and second data sets may be based on directional filtering of each data set. In this example, where there are multiple pixel sets and subsets, variance may be calculated for a pixel set based on any or all of the other pixel sets within a neighbor group of pixels. For example, where there are R, G, B, and IR channels, and R is the channel being interpolated, a value for a neighboring group of pixels may be determined based on the channel (of G, B, and IR) with the lowest local variance. Alternatively, the combined variance of R and 1 or more of G, B, and IR within a neighboring group may be used. This approach may be utilized whether interpolation is performed in 2, 4, or n directions.

Demosaiced RGB data of the scene may then be output at a third resolution, greater than the first resolution (e.g., the data set shown at 1460), and demosaiced IR light data of the scene may then be output at a fourth resolution, greater than the second resolution (e.g., the data set shown at 1470). In some examples, the demosaiced RGB data and demosaiced IR light data may be fused into a single image of the scene. In examples where the hybrid optical sensor array is comprised in a depth camera, the IR light data may be used to determine depth data for the scene. As such, depth values may be indicated for the scene based on the demosaiced infrared light data, as shown at 1480. The resulting depth values for the scene may then be fused with the demosaiced RGB data for the scene for output, as shown at 1490.

Figure 15:
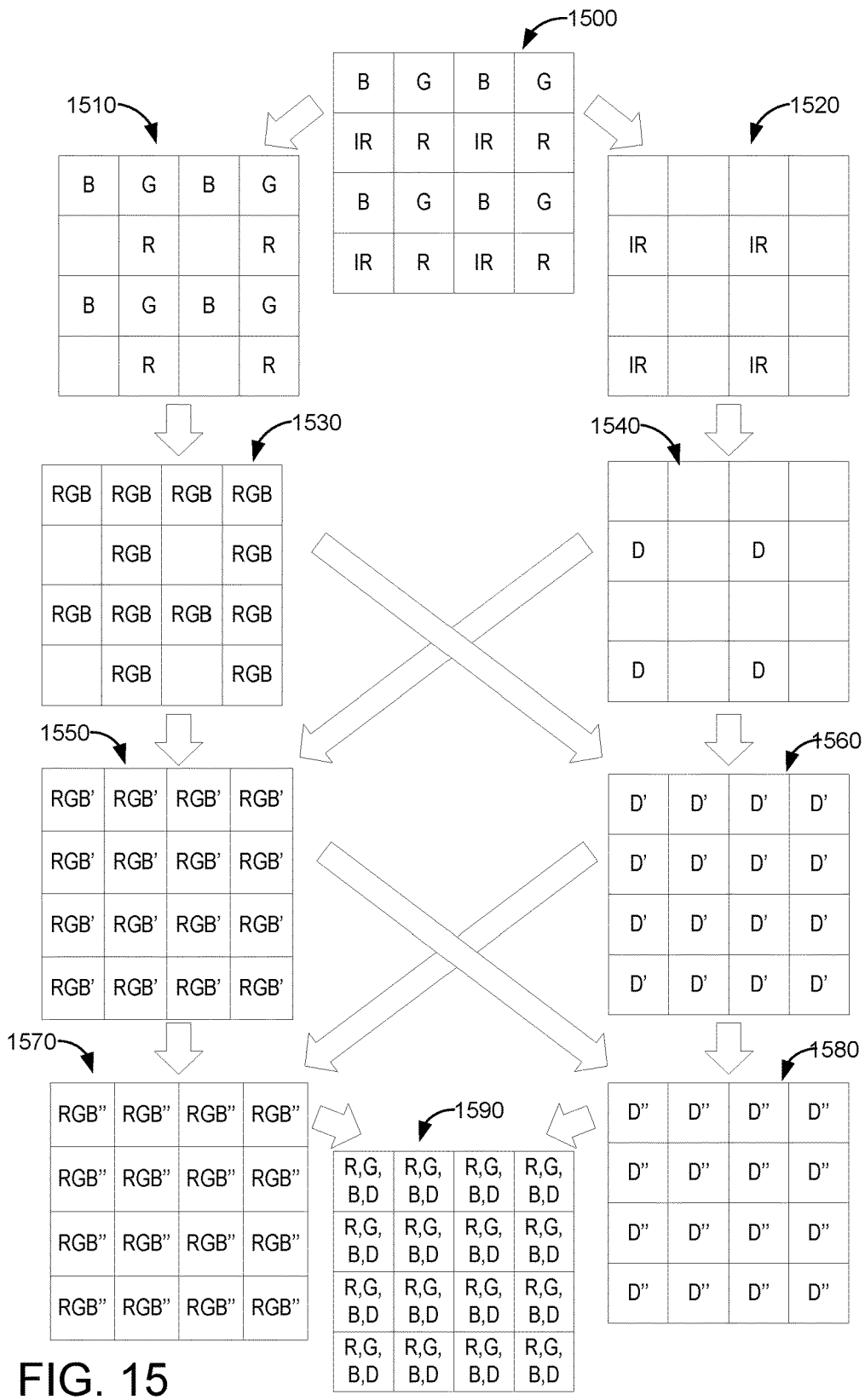
FIG. 15 schematically shows image processing for an RGB/IR hybrid optical sensor array using the method of FIG. 10.

Alternatively, depth values for the scene may be calculated from the initial IR light data for the scene. An example for image processing in this way is schematically shown in FIG. 15. For example, RGB data of a scene at a first resolution and infrared data for a scene at a second resolution may be received. For example, an initial data set is shown at 1500, comprising data for RGB light sensitive pixels (R). (G), & (B) interspersed with data for IR light sensitive pixels (IR). The initial data set is then parsed into a visible light data set 1510 and an IR data set 1520, each comprising data points for one data set interspersed with null data at points where data was received for the other data set. The RGB data set 1510 may then be demosaiced independently of IR data set 1520, yielding demosaiced data set 1530. Depth values may then be calculated for each IR light data point, independently from the RGB data, as shown at 1540.

The RGB data set may then be interpolated based on the depth value data set, yielding the upsampled RGB data set shown at 1550. Similarly, the IR light data set may then be interpolated based on the RGB data set, yielding the upsampled depth value data set shown at 1560. As described with regard to 1030 and 1040, joint interpolation of each of the first and second data sets may be based on the values, gradients, and/or discontinuities of the other data set. For example, differences between IR light data and RGB data may vary gradually, enabling the application of a low-pass filter. Interpolation may be applied within determined edge boundaries. Then, spatial information from depth values, IR light data and RGB data may be used to refine edge boundaries.

Next, the RGB data set may be reinterpolated based on the depth value data set, yielding the visible light data set shown at 1570. Similarly, the depth value data set may then be reinterpolated based on the RGB data set, yielding the depth value data set shown at 1580. As described with regard to 1050 and 1060, joint reinterpolation of each of the RGB and depth value data sets may be based on directional filtering of each data set. Demosaiced RGB data of the scene may then be output at a third resolution, greater than the first resolution (e.g., the data set shown at 1570), and demosaiced depth value data of the scene may then be output at a fourth resolution, greater than the second resolution (e.g., the data set shown at 1580). The demosaiced depth values for the scene may then be fused with the demosaiced RGB data for the scene for output, as shown at 1590.

In the examples shown in both FIGS. 14 and 15, the initial RGB resolution is greater than the initial IR resolution by a ratio of 3:1. As such, if the resolution of the RGB/IR hybrid optical sensor is n, the initial RGB resolution is 3n/4 and the initial IR resolution is n/4. Processing the two data sets using the method of FIG. 10, yields an RGB image with a resolution of n and an IR (and/or depth) image with a resolution of n.

Figure 16:
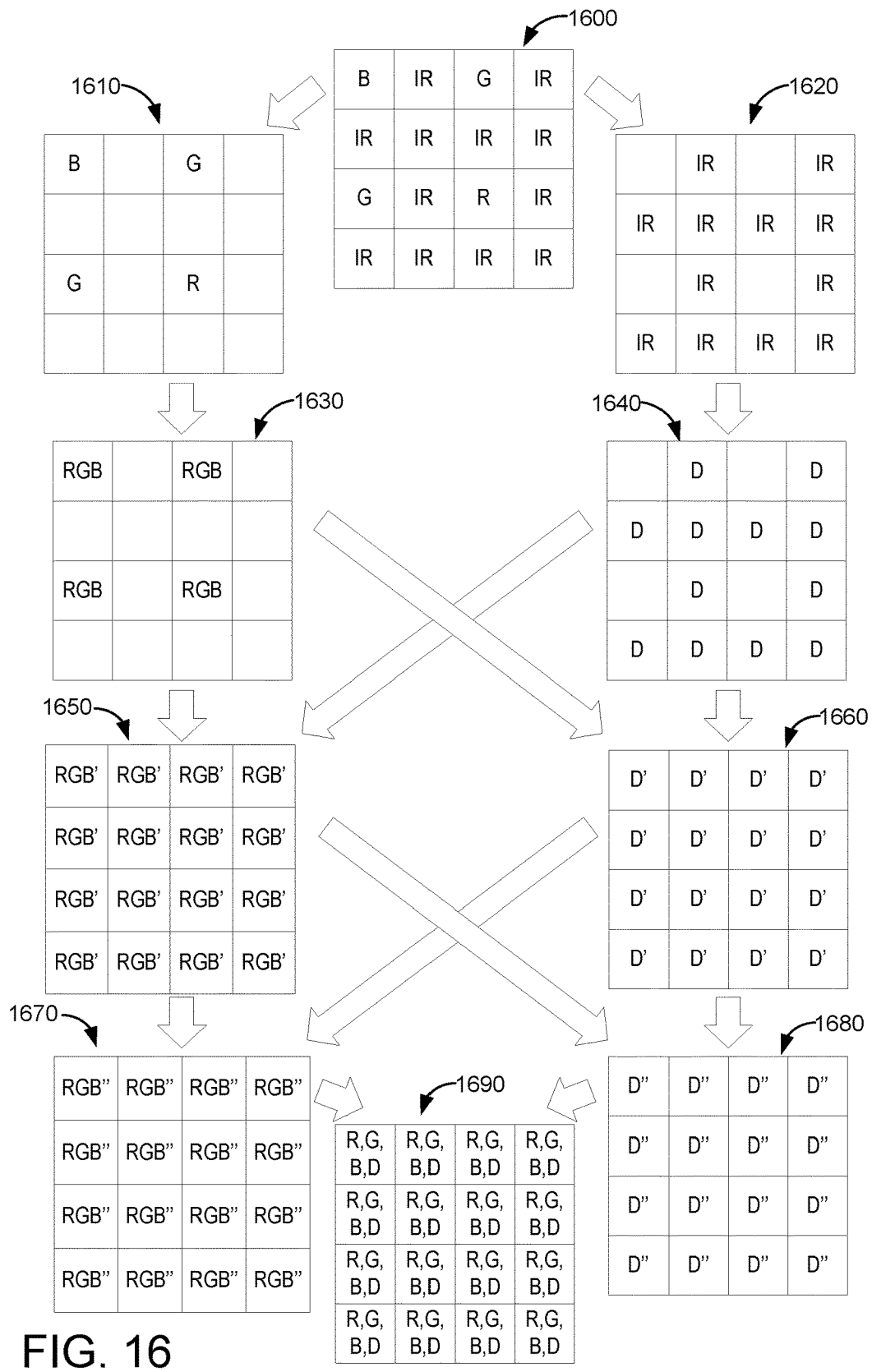
FIG. 16 schematically shows image processing for an RGB/IR hybrid optical sensor array using the method of FIG. 10.

In another example, the initial IR resolution may be greater than the initial RGB resolution by a ratio of 3:1, as shown in FIG. 2E. An example for image processing in this way is schematically shown in FIG. 16. For example, RGB data of a scene at a first resolution and infrared data for a scene at a second resolution may be received. For example, an initial data set is shown at 1600, comprising data for RGB light sensitive pixels (R), (G), & (B) interspersed with data for IR light sensitive pixels (IR). The initial data set is then parsed into a visible light data set 1610 and an IR data set 1620, each comprising data points for one data set interspersed with null data at points where data was received for the other data set. The RGB data set 1610 may then be demosaiced independently of IR data set 1620, yielding demosaiced data set 1630. Depth values may then be calculated for each IR light data point, independently from the RGB data, as shown at 1640.

The RGB data set may then be interpolated based on the depth value data set, yielding the upsampled RGB data set shown at 1650. Similarly, the IR light data set may then be interpolated based on the RGB data set, yielding the upsampled depth value data set shown at 1660. Next, the RGB data set may be reinterpolated based on the depth value data set, yielding the visible light data set shown at 1670. Similarly, the depth value data set may then be reinterpolated based on the RGB data set, yielding the depth value data set shown at 1680. As described with regard to 1050 and 1060, joint reinterpolation of each of the RGB and depth value data sets may be based on directional filtering of each data set. Demosaiced RGB data of the scene may then be output at a third resolution, greater than the first resolution (e.g., the data set shown at 1670), and demosaiced depth value data of the scene may then be output at a fourth resolution, greater than the second resolution (e.g., the data set shown at 1680). The demosaiced depth values for the scene may then be fused with the demosaiced RGB data for the scene for output, as shown at 1690. In this example, if the resolution of the RGB/IR hybrid optical sensor is n, the initial RGB resolution is n/4 and the initial IR resolution is 3n/4. Processing the two data sets using the method of FIG. 10, yields an RGB image with a resolution of n and an IR (and/or depth) image with a resolution of n. While the example depicted in FIG. 16 depicts depth value data being generated from the initial IR data set, in other examples, depth value data may be generated from the demosaiced IR data, similar to the example depicted in FIG. 14.

In some implementations, method 300, method 1000, and their derivatives described herein may be dynamically selected based on one or more factors, such as data quality, output data application, available processing power, sensor configuration, etc. In other implementations, the image processing method may be pre-determined or pre-selected.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
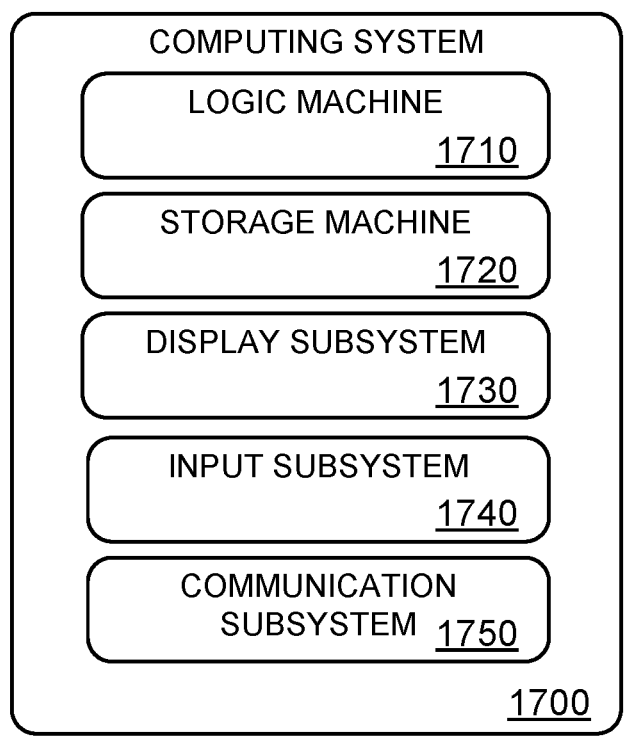
FIG. 17 shows a simplified schematic illustration of an example computing system that may be used in connection with the systems and methods described herein.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices.

Computing system 1700 includes a logic machine 1710 and a storage machine 1720. Computing system 1700 may optionally include a display subsystem 1730, input subsystem 1740, communication subsystem 1750, and/or other components not shown in FIG. 17.

Logic machine 1710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1720 includes one or more physical devices configured to hold instructions executable by the logic machine to implement the methods and processes described herein. When such methods and processes are implemented, the state of storage machine 1720 may be transformed—e.g., to hold different data.

Storage machine 1720 may include removable and/or built-in devices. Storage machine 1720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1720 may include volatile, nonvolatile, dynamic, static, read/write, read-only, random-access, sequential-access, location-addressable, file-addressable, and/or content-addressable devices.

It will be appreciated that storage machine 1720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1710 and storage machine 1720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 implemented to perform a particular function. In some cases, a module, program, or engine may be instantiated via logic machine 1710 executing instructions held by storage machine 1720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1730 may be used to present a visual representation of data held by storage machine 1720. This visual representation may take the form of a graphical user interface (GUI). As the herein described methods and processes change the data held by the storage machine, and thus transform the state of the storage machine, the state of display subsystem 1730 may likewise be transformed to visually represent changes in the underlying data. Display subsystem 1730 may include one or more display devices utilizing virtually any type of technology. Such display devices may be combined with logic machine 1710 and/or storage machine 1720 in a shared enclosure, or such display devices may be peripheral display devices.

When included, input subsystem 1740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1750 may be configured to communicatively couple computing system 1700 with one or more other computing devices. Communication subsystem 1750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

In one example, a method for an imaging device is presented, comprising: receiving, from a hybrid optical sensor array, a first set of data for a scene captured by a first set of pixels at a first resolution and a second set of data for a scene captured by a second set of pixels at a second resolution, the first and second sets of pixels having differing spectral sensitivities; demosaicing the first set of data based on at least the second set of data; and outputting, using the demosaiced first set of data, a third set of data for the scene at a third resolution, greater than the first resolution. In such an example, or any other example, demosaicing the first set of data based on at least the second set of data may additionally or alternatively comprise: interpolating the first set of data independent of the second set of data; and filtering the interpolated first set of data based on the second set of data. In any of the preceding examples, or any other example, the method may additionally or alternatively comprise demosaicing the second set of data based on at least the first set of data; and outputting, using the demosaiced second set of data, a fourth set of data for the scene at a fourth resolution, greater than the second resolution. In any of the preceding examples, or any other example, the demosaicing of the first set of data and the second set of data may additionally or alternatively comprise: jointly interpolating the first set of data and the second set of data; and jointly re-interpolating the interpolated first set of data and the interpolated second set of data. In any of the preceding examples, or any other example, jointly interpolating the first set of data and the second set of data may additionally or alternatively comprise directionally interpolating the first set of data and the second set of data. In any of the preceding examples, or any other example, the first set of pixels may additionally or alternatively be sensitive to visible light and the second set of pixels may additionally or alternatively be sensitive to infrared light. In any of the preceding examples, or any other example, the first set of pixels may additionally or alternatively be sensitive to wavelengths between 400 and 800 nm. In any of the preceding examples, or any other example, the first set of pixels may additionally or alternatively be sensitive to wavelengths between 400 and 650 nm. In any of the preceding examples, or any other example, the method may additionally or alternatively comprise generating depth information for the scene based on at least the fourth set of data. In any of the preceding examples, or any other example, the method may additionally or alternatively comprise generating depth information for the scene based on at least the second set of data, and wherein demosaicing the first set of data based on at least the second set of data further comprises demosaicing the first set of data based on the generated depth information for the scene. In any of the preceding examples, or any other example, the method may additionally or alternatively comprise jointly interpolating the first set of data and the generated depth information; and jointly re-interpolating the interpolated first set of data and the interpolated depth information.

In another example, a machine vision system is presented, comprising: a hybrid optical sensor array comprising a first set of pixels and a second set of pixels, the first set of pixels sensitive to visible light, the second set of pixels sensitive to infrared light, and wherein the first set of pixels are interspersed with the second set of pixels; and a storage machine holding instructions executable by a logic machine to: receive visible light of a scene at the first set of pixels; receive infrared light of the scene at the second set of pixels; generate a visible light data set of the scene at a first resolution based on the received visible light; generate an infrared light data set of the scene at a second resolution based on the received infrared light; demosaic the visible light data set of the scene based on the first infrared light data set of the scene; demosaic the infrared data set of the scene based on the first visible light data set of the scene; output, using the demosaiced visible light data set, a second visible light data set of the scene at a third resolution, greater than the first resolution; and output, using the demosaiced infrared data set, a second infrared light data set of the scene at a fourth resolution, greater than the second resolution. In such an example, or any other example, demosaicing the visible light data set of the scene based on the infrared light data set of the scene may additionally or alternatively comprise: (a) interpolating the visible light data set independent of the infrared light data set; and (b) filtering the interpolated visible light data set based on the infrared light data set, and demosaicing the infrared data set of the scene based on the visible light data set of the scene may additionally or alternatively comprise: (a) interpolating the infrared light data set independent of the visible light data set; and (b) filtering the interpolated infrared light data set based on the visible light data set. In any of the preceding examples, or any other example, demosaicing the visible light data set of the scene based on the infrared light data set of the scene may additionally or alternatively comprise: (a) interpolating the visible light data set based on the infrared light data set; and (b) reinterpolating the interpolated visible light data set based on the infrared light data set using directional filtering, and demosaicing the infrared light data set of the scene based on the visible light data set of the scene may additionally or alternatively comprise: (a) interpolating the infrared light data set based on the visible light data set; and (b) reinterpolating the interpolated infrared light data set based on the visible light data set using directional filtering. In any of the preceding examples, or any other example, the hybrid optical sensor array may additionally or alternatively be disposed within a depth imaging device, and the storage machine may additionally or alternatively hold instructions executable by the logic machine to: generate depth values for the scene at the fourth resolution based on the second infrared light data set.

In yet another example, a machine vision system is presented, comprising: a depth imaging device, comprising: an infrared illumination source; a hybrid optical sensor array comprising a first set of pixels and a second set of pixels, the first set of pixels sensitive to visible light, the second set of pixels sensitive to infrared light, and wherein the first set of pixels are interspersed with the second set of pixels; and a storage machine holding instructions executable by a logic machine to: receive visible light of a scene at the first set of pixels; receive infrared light of the scene at the second set of pixels; generate a visible light data set of the scene at a first resolution based on the received visible light; generate an infrared light data set of the scene at a second resolution based on the received infrared light; generate depth values for the scene at the second resolution based on the infrared light data set; demosaic the visible light data set of the scene based on the depth values for the scene; demosaic the depth values for the scene based on the visible light data set of the scene; output, using the demosaiced visible light data set, a second visible light data set of the scene at a third resolution, greater than the first resolution; and output, using the demosaiced depth values for the scene, a second set of depth values for the scene at a fourth resolution, greater than the second resolution. In such an example, or any other example, demosaicing the visible light data set of the scene based on the depth values for the scene may additionally or alternatively comprise: (a) interpolating the visible light data set independent of the depth values for the scene; and (b) filtering the interpolated visible light data set based on the depth values for the scene, and demosaicing the depth values for the scene based on the visible light data set of the scene may additionally or alternatively comprise: (a) interpolating the depth values for the scene independent of the visible light data set; and (b) filtering the interpolated depth values for the scene based on the visible light data set. In any of the preceding examples, or any other example, demosaicing the visible light data set of the scene based on the depth values for the scene may additionally or alternatively comprise: (a) interpolating the visible light data set based on the depth values for the scene; and (b) reinterpolating the interpolated visible light data set based on the depth values for the scene using directional filtering, and demosaicing the depth values for the scene based on the visible light data set of the scene may additionally or alternatively comprise: (a) interpolating the depth values for the scene based on the visible light data set; and (b) reinterpolating the interpolated depth values for the scene based on the visible light data set using directional filtering. In any of the preceding examples, or any other example, demosaicing the visible light data set of the scene based on the depth values for the scene may additionally or alternatively comprise: demosaicing the visible light data set of the scene based on active brightness values for the scene. In any of the preceding examples, or any other example, demosaicing the visible light data set of the scene based on the depth values for the scene may additionally or alternatively comprise: demosaicing the visible light data set of the scene based on reflectivity values for the scene.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents, thereof.

The invention claimed is:

1. A method for an imaging device, comprising:
receiving, from a hybrid optical sensor array, a first set of data for a scene captured by a first set of pixels at a first resolution and a second set of data for a scene captured by a second set of pixels at a second resolution, the first and second sets of pixels having differing spectral sensitivities;
demosaicing the first set of data based on at least the second set of data by executing one or more of:
a) interpolating the first set of data independent of the second set of data; and
filtering the interpolated first set of data based on the second set of data; and
b) interpolating the first set of data based on the second set of data; and
outputting, using the demosaiced first set of data, a third set of data for the scene at a third resolution, greater than the first resolution.

2. The method of claim 1, further comprising:
demosaicing the second set of data based on at least the first set of data; and
outputting, using the demosaiced second set of data, a fourth set of data for the scene at a fourth resolution, greater than the second resolution.

3. The method of claim 2, wherein the demosacing of the first set of data and the second set of data comprises:

jointly interpolating the first set of data and the second set of data; and jointly re-interpolating the interpolated first set of data and the interpolated second set of data.

4. The method of claim 3, wherein jointly interpolating the first set of data and the second set of data comprises directionally interpolating the first set of data and the second set of data.

5. The method of claim 2, wherein the first set of pixels are sensitive to visible light and the second set of pixels are sensitive to infrared light.

6. The method of claim 5, wherein the first set of pixels are sensitive to wavelengths between 400 and 800 nm.

7. The method of claim 5, wherein the first set of pixels are sensitive to wavelengths between 400 and 650 nm.

8. The method of claim 5, further comprising:
generating depth information for the scene based on at least the fourth set of data.

9. The method of claim 5, further comprising:
generating depth information for the scene based on at least the second set of data, and wherein demosaicing the first set of data based on at least the second set of data further comprises demosaicing the first set of data based on the generated depth information for the scene.

10. The method of claim 9, further comprising:
jointly interpolating the first set of data and the generated depth information; and
jointly re-interpolating the interpolated first set of data and the interpolated depth information.

11. The method of claim 10, wherein jointly interpolating the first set of data and the generated depth information comprises:
jointly interpolating the first set of data and the generated depth information based on at least a depth value confidence for the generated depth information for the scene.

12. The method of claim 10, wherein jointly re-interpolating the first set of data and the generated depth information comprises:
jointly re-interpolating the first set of data and the generated depth information based on at least a depth value confidence for the generated depth information for the scene.

13. The method of claim 9, wherein demosaicing the first set of data based on the generated depth information for the scene comprises:
demosaicing the first set of data based on a depth value confidence for the generated depth information for the scene.

14. A machine vision system, comprising:
a hybrid optical sensor array comprising a first set of pixels and a second set of pixels, the first set of pixels sensitive to visible light, the second set of pixels sensitive to infrared light, and wherein the first set of pixels are interspersed with the second set of pixels; and
a storage machine holding instructions executable by a logic machine to:
receive visible light of a scene at the first set of pixels;
receive infrared light of the scene at the second set of pixels;
generate a visible light data set of the scene at a first resolution based on the received visible light;
generate an infrared light data set of the scene at a second resolution based on the received infrared light;

demosaic the visible light data set of the scene based on the first infrared light data set of the scene;
demosaic the infrared data set of the scene based on the first visible light data set of the scene;
output, using the demosaiced visible light data set, a second visible light data set of the scene at a third resolution, greater than the first resolution; and
output, using the demosaiced infrared data set, a second infrared light data set of the scene at a fourth resolution, greater than the second resolution.

15. The machine vision system of claim 14, wherein demosaicing the visible light data set of the scene based on the infrared light data set of the scene comprises:
(a) interpolating the visible light data set independent of the infrared light data set; and
(b) filtering the interpolated visible light data set based on the infrared light data set,
and wherein:
demosaicing the infrared data set of the scene based on the visible light data set of the scene comprises:
(a) interpolating the infrared light data set independent of the visible light data set; and
(b) filtering the interpolated infrared light data set based on the visible light data set.

16. The machine vision system of claim 14, wherein demosaicing the visible light data set of the scene based on the infrared light data set of the scene comprises:
(a) interpolating the visible light data set based on the infrared light data set; and
(b) reinterpolating the interpolated visible light data set based on the infrared light data set using directional filtering,
and wherein demosaicing the infrared light data set of the scene based on the visible light data set of the scene comprises:
(a) interpolating the infrared light data set based on the visible light data set; and
(b) reinterpolating the interpolated infrared light data set based on the visible light data set using directional filtering.

17. The machine vision system of claim 14, wherein the hybrid optical sensor array is disposed within a depth imaging device, and wherein the storage machine further holds instructions executable by the logic machine to:
generate depth values for the scene at the fourth resolution based on the second infrared light data set.

18. A machine vision system, comprising:
a depth imaging device, comprising:
an infrared illumination source;
a hybrid optical sensor array comprising a first set of pixels and a second set of pixels, the first set of pixels sensitive to visible light, the second set of pixels sensitive to infrared light, and wherein the first set of pixels are interspersed with the second set of pixels; and
a storage machine holding instructions executable by a logic machine to:
receive visible light of a scene at the first set of pixels;
receive infrared light of the scene at the second set of pixels;
generate a visible light data set of the scene at a first resolution based on the received visible light;
generate an infrared light data set of the scene at a second resolution based on the received infrared light;

generate depth values for the scene at the second resolution based on the infrared light data set;

demosaic the visible light data set of the scene based on the depth values for the scene;

demosaic the depth values for the scene based on the visible light data set of the scene;

output, using the demosaiced visible light data set, a second visible light data set of the scene at a third resolution, greater than the first resolution; and output, using the demosaiced depth values for the scene, a second set of depth values for the scene at a fourth resolution, greater than the second resolution.

19. The machine vision system of claim 18, wherein demosaicing the visible light data set of the scene based on the depth values for the scene comprises:

(a) interpolating the visible light data set independent of the depth values for the scene; and (b) filtering the interpolated visible light data set based on the depth values for the scene, and wherein demosaicing the depth values for the scene based on the visible light data set of the scene comprises:

(a) interpolating the depth values for the scene independent of the visible light data set; and (b) filtering the interpolated depth values for the scene based on the visible light data set.

20. The machine vision system of claim 19, wherein filtering the interpolated visible light data set based on the depth values for the scene comprises:

filtering the interpolated visible light data set based on a depth value confidence for the depth values for the scene.

21. The machine vision system of claim 18, wherein demosaicing the visible light data set of the scene based on the depth values for the scene comprises:

(a) interpolating the visible light data set based on the depth values for the scene; and (b) reinterpolating the interpolated visible light data set based on the depth values for the scene using directional filtering, and wherein demosaicing the depth values for the scene based on the visible light data set of the scene comprises:

(a) interpolating the depth values for the scene based on the visible light data set; and (b) reinterpolating the interpolated depth values for the scene based on the visible light data set using directional filtering.

22. The machine vision system of claim 21, wherein interpolating the visible light data set based on the depth values for the scene comprises:

interpolating the visible light data set based on a depth value confidence for the depth values for the scene.

23. The machine vision system of claim 21, wherein reinterpolating the interpolated visible light data set based on the depth values for the scene using directional filtering comprises:

reinterpolating the interpolated visible light data set based on a depth value confidence for the depth values for the scene using directional filtering.

24. The machine vision system of claim 18, wherein demosaicing the visible light data set of the scene based on the depth values for the scene comprises:

demosaicing the visible light data set of the scene based on active brightness values for the scene.

25. The machine vision system of claim 18, wherein demosaicing the visible light data set of the scene based on the depth values for the scene comprises:

demosaicing the visible light data set of the scene based on reflectivity values for the scene.

26. The machine vision system of claim 18, wherein demosaicing the visible light data set of the scene based on the depth values for the scene comprises:

demosaicing the visible light data set of the scene based on a depth value confidence for the generated depth values for the scene.

* * * * *